(12) United States Patent
Nagasaka et al.

(10) Patent No.: US 10,289,212 B2
(45) Date of Patent: May 14, 2019

(54) ELECTRONIC DEVICE AND NON TRANSITORY STORAGE MEDIUM

(71) Applicant: KYOCERA Corporation, Kyoto-shi, Kyoto (JP)

(72) Inventors: Yushi Nagasaka, Ritto (JP); Masato Fujishiro, Yokohama (JP); Atsuhisa Inakoshi, Yokohama (JP); Katsuhiro Mitsui, Ritto (JP); Yukiko Takaba, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/634,050

(22) Filed: Jun. 27, 2017

(65) Prior Publication Data

US 2018/0004307 A1  Jan. 4, 2018

(30) Foreign Application Priority Data

Jun. 30, 2016  (JP) .................................. 2016-131053

(51) Int. Cl.
| | | |
|---|---|---|
| *G06F 3/023* | (2006.01) | |
| *G06F 3/0488* | (2013.01) | |
| *G06F 3/02* | (2006.01) | |
| *G06F 3/041* | (2006.01) | |

(52) U.S. Cl.
CPC ............ *G06F 3/0233* (2013.01); *G06F 3/021* (2013.01); *G06F 3/0416* (2013.01); *G06F 3/04886* (2013.01)

(58) Field of Classification Search
None
See application file for complete search history.

(56) References Cited

U.S. PATENT DOCUMENTS

| | | | | |
|---|---|---|---|---|
| 2010/0245252 | A1* | 9/2010 | Ghassabian | ........... G06F 3/0233 |
| | | | | 345/169 |
| 2015/0234593 | A1* | 8/2015 | St. Clair | ............. G06F 3/04886 |
| | | | | 345/168 |
| 2016/0274788 | A1* | 9/2016 | Li | ........................ G06F 3/04886 |

FOREIGN PATENT DOCUMENTS

WO   2008/086302 A1   7/2008

\* cited by examiner

*Primary Examiner* — Ifedayo B Iluyomade
(74) *Attorney, Agent, or Firm* — Hauptman Ham, LLP

(57) ABSTRACT

An electronic device includes a housing, a touch screen arranged on the housing, a plurality of first software keys arranged along a first edge of the touch screen, a plurality of second software keys arranged along a second edge of the touch screen, a plurality of physical keys arranged along the first edge, and at least one controller. The at least one controller is configured to execute a process according to an operation on any one of the first software keys, the second software keys and the physical keys. The at least one controller is further configured to allocate characters "Q", "W", "E", "R", "T", "Y", "U", "I", "O" and "P" to the physical keys respectively, characters "A", "S", "D", "F", "G", "H", "J", "K" and "L" to the first software keys respectively, and characters "Z", "X", "C", "V", "B", "N" and "M" to the second software keys respectively.

5 Claims, 24 Drawing Sheets

FIG.6

| FIRST KEY DATA | ROW TO BE ALLOCATED |
|---|---|
| ARRAY 1 (FIRST ROW) | q, w, e, r, t, y, u, i, o, p |
| ARRAY 2 (SECOND ROW) | a, s, d, f, g, h, j, k, l |
| ARRAY 3 (THIRD ROW) | shift, z, x, c, v, b, n, m, delete |

FIG.7

| SECOND KEY DATA | ARRAY 1 (FIRST ROW/ q-ROW) | ARRAY 2 (SECOND ROW/ a-ROW) | ARRAY 3 (THIRD ROW/ z-ROW) |
|---|---|---|---|
| ELEMENT 1 | q | a | shift |
| ELEMENT 2 | w | s | z |
| ELEMENT 3 | e | d | x |
| ELEMENT 4 | r | f | c |
| ELEMENT 5 | t | g | v |
| ELEMENT 6 | y | h | b |
| ELEMENT 7 | u | j | n |
| ELEMENT 8 | i | k | m |
| ELEMENT 9 | o | l | delete |
| ELEMENT 10 | p | | |

ELECTRONIC DEVICE AND NON TRANSITORY STORAGE MEDIUM

CROSS-REFERENCE TO RELATED APPLICATION

The present application claims priority to and incorporates by reference the entire contents of Japanese Patent Application No. 2016-131053 filed in Japan on Jun. 30, 2016.

FIELD

The present application relates to an electronic device, a control method and a non-transitory storage medium.

BACKGROUND

There are electronic devices each of which has physical keys and a touch screen. For example, an electronic device that enables various types of functions according to operations that are detected via physical keys and a touch screen is known.

SUMMARY

An electronic device, a control method and a non-transitory storage medium are disclosed.

According to one aspect, there is provided an electronic device comprising a housing, a touch screen that is arranged on the housing, a plurality of first software keys that are arranged along a first edge of the touch screen, a plurality of second software keys that are arranged along a second edge of the touch screen, a plurality of physical keys that are arranged along the first edge, and at least one controller. The at least one controller is configured to execute a process according to an operation on any one of the first software keys, the second software keys and the physical keys. The at least one controller is further configured to allocate characters that are "Q", "W", "E", "R", "T", "Y", "U", "I", "O" and "P" to the physical keys respectively, allocate characters that are "A", "S", "D", "F", "G", "H", "J", "K" and "L" to the first software keys respectively, and allocate characters that are "Z", "X", "C", "V", "B", "N" and "M" to the second software keys respectively. Alternatively, the at least one controller is further configured to allocate characters that are "Q", "W", "E", "R", "T", "Y", "U", "I", "O" and "P" to the second software keys respectively, allocate characters that are "A", "S", "D", "F", "G", "H", "J", "K" and "L" to the first software keys respectively, and allocate characters that are "Z", "X", "C", "V", "B", "N" and "M" to the physical keys respectively.

According to one aspect, there is provided an electronic device comprising a housing, a touch screen, a plurality of first software keys that are arranged along a first edge of the touch screen, a plurality of second software keys that are arranged along a second edge of the touch screen, and at least one controller. The at least one controller is configured to execute a process according to an operation on any one of the first software keys and the second software keys. The at least one controller is further configured to allocate a row including "Q", "W", "E", "R", "T", "Y", "U", "I", "O" and "P" to one of the first software keys, allocate a row including "A", "S", "D", "F", "G", "H", "J", "K" and "L" to another of the first software keys, and allocate a row including "Z", "X", "C", "V", "B", "N" and "M" to the other of the first software keys. The at least one controller is further configured to allocate characters that are "Q", "W", "E", "R", "T", "Y", "U", "I", "O" and "P" to the second software keys respectively, when an operation on the first software key to which the row including "Q", "W", "E", "R", "T", "Y", "U", "I", "O" and "P" is allocated is detected. The at least one controller is further configured to allocate characters that are "A", "S", "D", "F", "G", "H", "J", "K" and "L" to the second software keys respectively, when an operation on the first software key to which the row including "A", "S", "D", "F", "G", "H", "J", "K" and "L" is allocated is detected. The at least one controller is further configured to allocate characters that are "Z", "X", "C", "V", "B", "N" and "M" to the second software keys respectively, when an operation on the first software key to which the row including "Z", "X", "C", "V", "B", "N" and "M" is allocated is detected.

According to one aspect, there is provided a control method performed by an electronic device including a housing, a touch screen that is arranged on the housing, a plurality of first software keys that are arranged along a first edge of the touch screen, a plurality of second software keys that are arranged along a second edge of the touch screen, and a plurality of physical keys that are arranged along the first edge. The control method includes allocating characters that are "Q", "W", "E", "R", "T", "Y", "U", "I", "O" and "P" to the physical keys respectively, allocating characters that are "A", "S", "D", "F", "G", "H", "J", "K" and "L" to the first software keys, respectively and allocating characters that are "Z", "X", "C", "V", "B", "N" and "M" to the second software keys respectively. Alternatively the control method includes allocating characters that are "Q", "W", "E", "R", "T", "Y", "U", "I", "O" and "P" to the second software keys respectively, allocating characters that are "A", "S", "D", "F", "G", "H", "J", "K" and "L" to the first software keys respectively, and allocating characters that are "Z", "X", "C", "V", "B", "N" and "M" to the physical keys respectively.

According to one aspect, there is provided a control method performed by an electronic device including a housing, a touch screen, a plurality of first software keys that are arranged along a first edge of the touch screen, and a plurality of second software keys that are arranged along a second edge of the touch screen. The control method includes allocating a row including "Q", "W", "E", "R", "T", "Y", "U", "I", "O" and "P" to one of the first software keys, allocating a row including "A", "S", "D", "F", "G", "H", "J", "K" and "L" to another of the first software keys, and allocating a row including "Z", "X", "C", "V", "B", "N" and "M" to the other of the first software keys. The control method further includes allocating characters that are "Q", "W", "E", "R", "T", "Y", "U", "I", "O" and "P" to the second software keys respectively, when an operation on the first software key to which the row including "Q", "W", "E", "R", "T", "Y", "U", "I", "O" and "P" is allocated is detected. The control method further includes allocating characters that are "A", "S", "D", "F", "G", "H", "J", "K" and "L" to the second software keys respectively, when an operation on the first software key to which the row including "A", "S", "D", "F", "G", "H", "J", "K" and "L" is allocated is detected. The control method further includes allocating characters that are "Z", "X", "C", "V", "B", "N" and "M" to the second software keys respectively, when an operation on the first software key to which the row including "Z", "X", "C", "V", "B", "N" and "M" is allocated is detected.

The above and other objects, features, advantages and technical and industrial significance of this application will be better understood by reading the following detailed description of presently preferred embodiments of the invention, when considered in connection with the accompanying drawings.

BRIEF DESCRIPTION OF THE DRAWINGS

FIG. 6 is a table representing exemplary first key data;

FIG. 7 is a table representing exemplary second key data;

DETAILED DESCRIPTION OF THE PREFERRED EMBODIMENTS

Embodiments for the electronic device, the control method and the non-transitory storage medium according to the present application will be described in detail with reference to the accompanying drawings.

The electronic device according to the embodiment may be a device, such as an electronic device, a mobile phone, a tablet, a portable personal computer, a media player, an electronic book reader, a navigator, a wearable device or a game machine.

Figure 1:
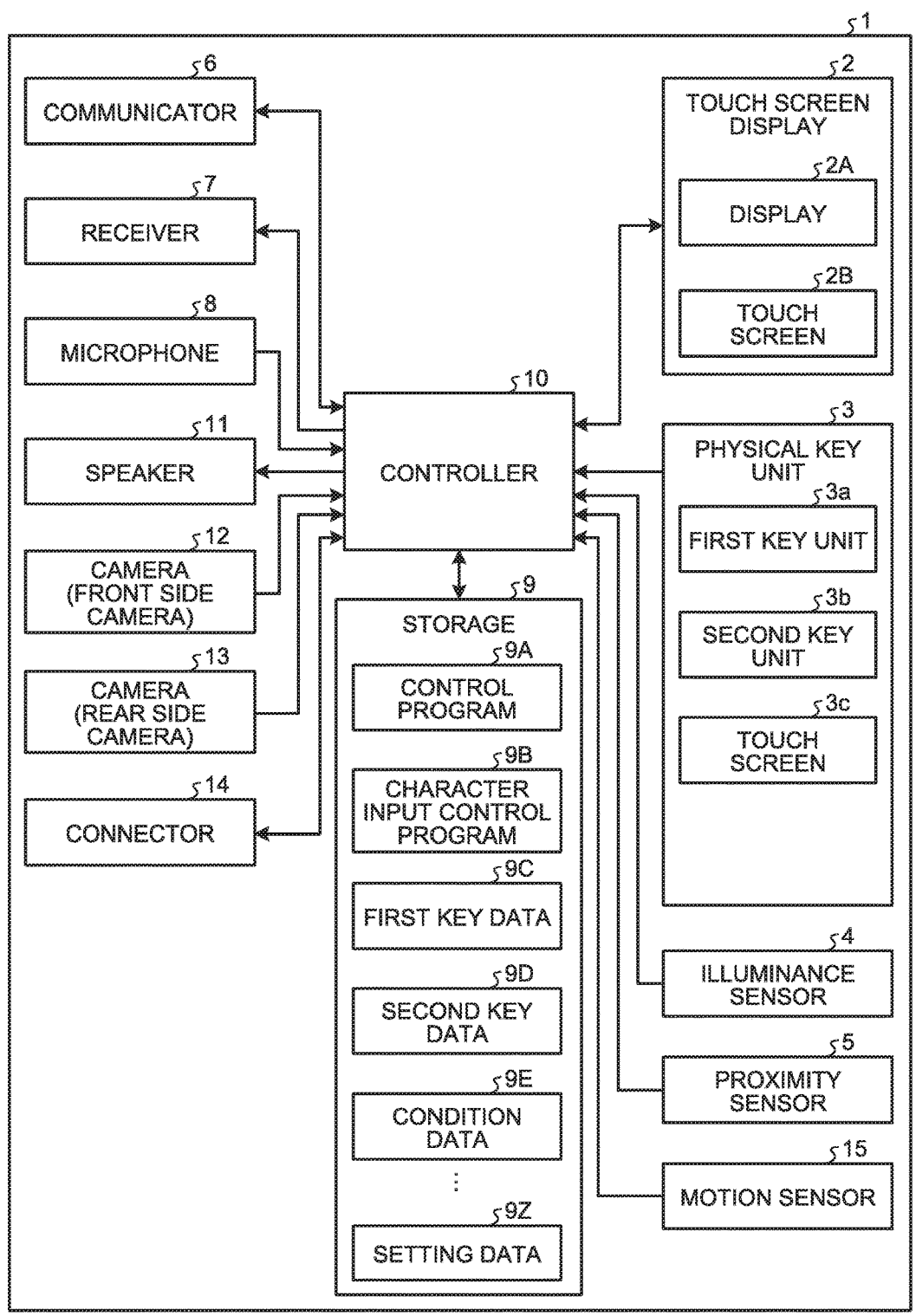
FIG. 1 is a block diagram illustrating an exemplary functional configuration of an electronic device according to embodiments.

FIG. 1 is a block diagram illustrating an exemplary functional configuration of an electronic device according to embodiments. In the following descriptions, the same components may be denoted with the same reference numerals. In the following descriptions, redundant descriptions may be omitted.

As illustrated in FIG. 1, an electronic device 1 includes a touch screen display 2, a physical key unit 3, a an illuminance sensor 4, a proximity sensor 5, a communicator 6, a receiver 7, a microphone 8, a storage 9, a controller 10, a speaker 11, a camera 12, a camera 13, a connector 14 and a motion sensor 15.

The touch screen display 2 includes a display 2A and a touch screen 2B. For example, the display 2A and the touch screen 2B may be positioned in a superimposed manner, may be positioned side-by-side, or may be positioned separately. When the display 2A and the touch screen 2B are positioned in a superimposed manner, for example, at least one of the sides of the display 2A need not be along any of the sides of the touch screen 2B.

The display 2A includes a display device, such as a liquid crystal display (LCD), an organic electroluminescence display (OELD) or an inorganic electroluminescence display (IELD). The display 2A displays an object, such as characters, images, symbols or diagrams, in a screen. The screen containing the object displayed by the display 2A includes a screen that is referred to as a lock screen, a screen referred to as a home screen, and an application screen that is displayed during execution of an application. The home screen may be also referred to as a desktop, an idle screen, a standard screen, an application list screen or a launcher screen.

The touch screen 2B detects contact. The controller 10 detects a gesture with respect to the electronic device 1 as an operation. Specifically, the controller 10 cooperates with the touch screen 2B to detect the operation (the gesture) with respect to the touch screen 2B (the touch screen display 2).

The touch screen 2B detects the contact of, for example, a finger, a pen or a stylus pen with the touch screen 2B or proximity of, for example, a finger, a pen or a stylus pen to the touch screen 2B. The touch screen 2B is able to detect a position on the touch screen 2B which is contacted with fingers, a pen or a stylus pen. In the following descriptions, the position of the contact with or the approach by the fingers, the pen or the stylus pen detected by the touch screen 2B will be referred to as a "detection position". The touch screen 2B notifies the controller 10 of the contact of the fingers with the touch screen 2B or the approach of the fingers to the touch screen 2B together with the detection position. The touch screen 2B may notify the controller 10 of the contact or the approach by notifying the controller 10 of the detection position. The touch screen display 2 including the touch screen 2B is able to execute operations that the touch screen 2B is able to perform. In other words, the touch screen display 2 may perform the operations performed by the touch screen 2B.

The controller 10 determines type of the gesture based on at least one of the contact or the approach detected by the touch screen 2B, the detection position, a change of the detection position, a duration of the contact or the approach, the time interval between the contacts or the approaches, and the amount of times of the contact or approach. The electronic device 1 including the controller 10 is able to execute operations that the controller 10 is able to perform. In other words, the electronic device 1 may perform the operations performed by the controller 10. The gesture is an operation performed on the touch screen 2B with the fingers. The operation performed on the touch screen 2B may be performed on the touch screen display 2 including the touch screen 2B. Examples of the gesture determined by the controller 10 via the touch screen 2B include, but are not limited to, touch, long touch, release, swipe, tap, double tap, long tap, drag, flick, pinch-in, pinch-out, etc.

The detection method of the touch screen 2B may be any method, such as a capacitance method, a resistance film method, a surface acoustic wave method, an infrared method or a load sensing method.

Figure 2:
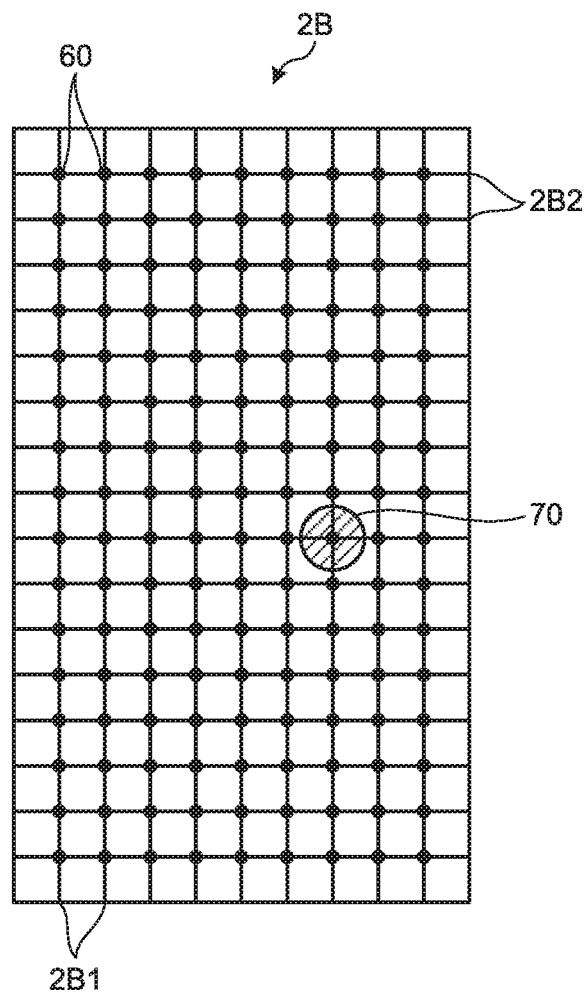
FIG. 2 is a diagram illustrating an exemplary configuration for detection in a touch screen.

FIG. 2 is a diagram illustrating an exemplary configuration for detection in a touch screen. For example, as illustrated in FIG. 2, the touch screen 2B includes a plurality of first electrodes 2B1 and a plurality of second electrodes 2B2. The first electrodes 2B1 are electrodes extending along a direction of long sides of the touch screen 2B. The second electrodes 2B2 are electrodes extending along short sides of the touch screen 2B. The first electrodes 2B1 and the second electrodes 2B2 intersect in a matrix. Each of the intersections of the first electrode 2B1 and the second electrode 2B2 serves as a detection point 60 on the touch screen 2B. The touch screen 2B contains the multiple detection points 60. The electronic device 1 uses the detection points 60 to specify the position in which a contacting object contacts the touch screen 2B (point of contact). The multiple detection points 60 are positioned in a matrix.

In the touch screen 2B, when a conductive contacting object gets close to the first electrode 2B1 and the second electrode 2B2, capacitive coupling occurs between the contacting object and the electrodes. In the touch screen 2B, the detection value at the detection point 60 between the electrodes at which capacitive coupling occurs varies. In the example illustrated in FIG. 2, in the touch screen 2B, the detection value at the detection point 60 around a point 70 contacted by the contacting object is larger than the detection values at other detection points 60. The electronic device 1 is thus able to detect the point 70 contacted by the contacting object with the touch screen 2B based on the varied detection value at the detection points 60.

The physical key unit 3 receives an operation input from a user. The physical key unit 3 includes a first key unit 3a, a second key unit 3b and a touch screen 3c.

Figure 3:
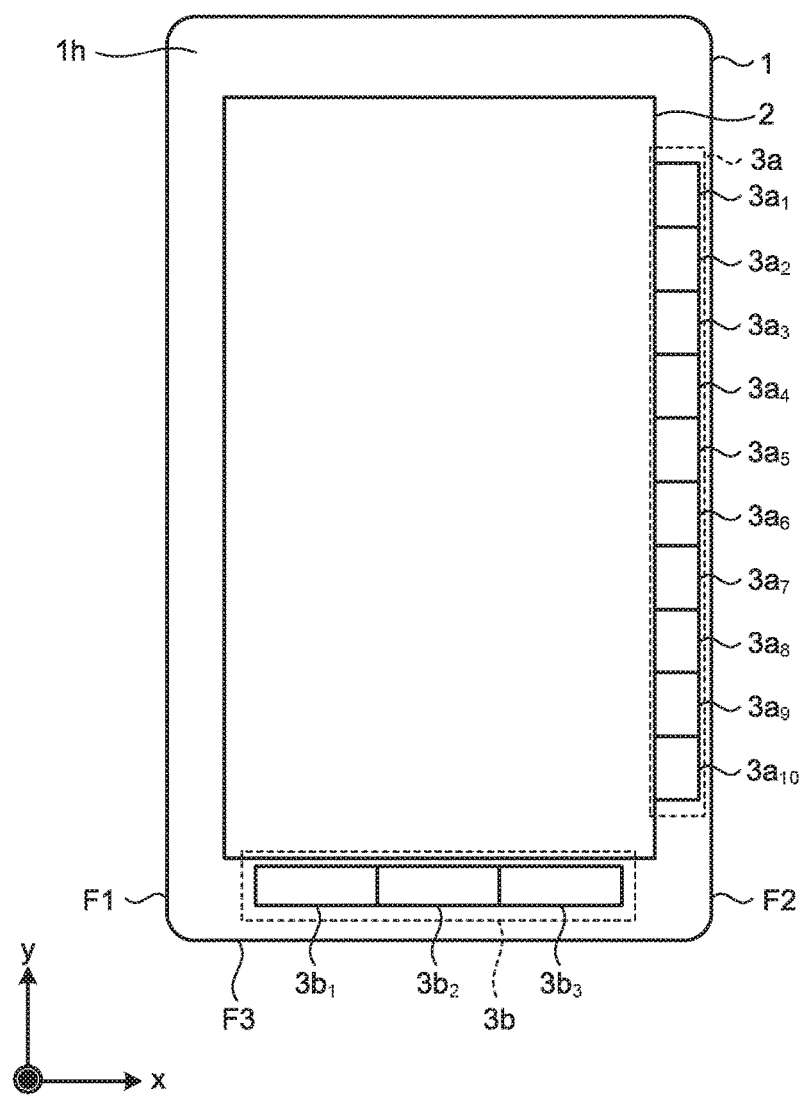
FIG. 3 is a diagram illustrating exemplary arrangement of key units according to the embodiments.

Exemplary arrangement of the physical key units according to the embodiments will be described with reference to FIGS. 3 and 4. FIG. 3 is a diagram illustrating the exemplary arrangement of the key units according to the embodiments.

Figure 4:
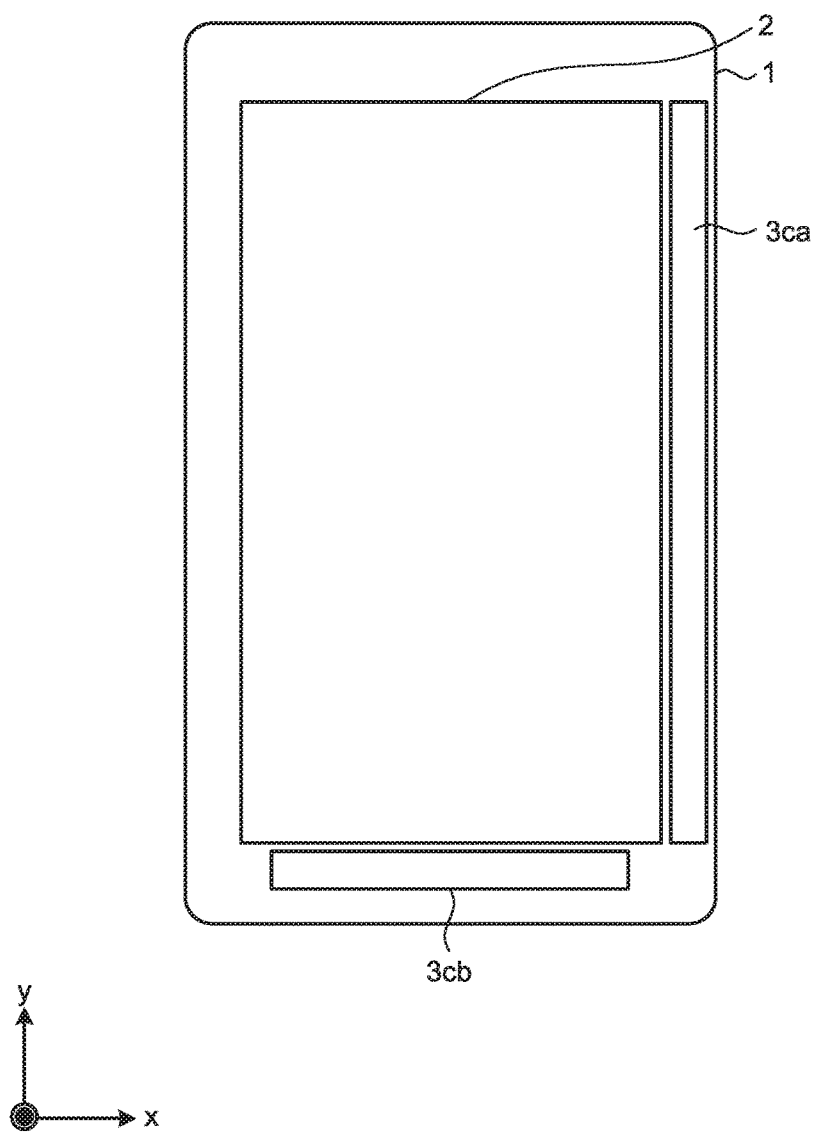
FIG. 4 is a diagram illustrating exemplary arrangement of a touch screen according to the embodiments.

FIG. 4 is a diagram illustrating exemplary arrangement of the touch screen according to the embodiments.

The electronic device 1 includes a housing 1h substantially forming a cuboid, and the plane surface of the electronic device 1 is substantially rectangular as illustrated in FIG. 3. The first key unit 3a includes ten physical keys in total that are physical keys $3a_1$ to $3a_{10}$. The physical keys $3a_1$ to $3a_{10}$ are arranged along an edge F2 on the right side of the housing 1h of the electronic device 1 in FIG. 3 in a row in a direction parallel to the y-axis illustrated in FIG. 3. The second key unit 3b includes three physical keys in total that are a physical key $3b_1$, a physical key $3b_2$ and a physical key $3b_3$ illustrated in FIG. 3. The physical key $3b_1$, the physical key $3b_2$ and the physical key $3b_3$ are arranged along an edge F3 on the bottom side of the housing 1h of the electronic device 1 in a row in a direction parallel to the x-axis illustrated in FIG. 3. In the embodiment in FIG. 3, no physical key is arranged along an edge F1 on the left side of the housing 1h of the electronic device 1; however, physical keys may be arranged along the edge F1. The amount of the physical keys configuring the first key unit 3a and the amount of physical keys configuring the second key unit 3b illustrated in FIG. 3 are examples only, and the first key unit 3a and the second key unit 3b do not necessarily consist of the same amounts of the physical keys as those in the example illustrated in FIG. 3. In the example illustrated in FIG. 3, the physical keys $3a_1$ to $3a_{10}$ are arranged along the edge F2 on the right side of the housing 1h of the electronic device 1. Alternatively, the physical keys $3a_1$ to $3a_{10}$ may be arranged along one of the sides forming an outline of the touch screen display 2. For example, the physical keys $3a_1$ to $3a_{10}$ may be arranged along the edge F1 on the left side of the housing 1h of the electronic device 1. Similarly, the physical key $3b_1$, the physical key $3b_2$, and the physical key $3b_3$ may be arranged along one of the sides forming the outline of the touch screen display 2. In other words, the first key unit 3a and the second key unit 3b may be arranged along an outer side of the housing 1h, or along an inner side of the housing 1h, that is, a boundary between the housing 1h and the touch screen display 2.

The physical keys $3a_1$ to $3a_{10}$ constituting the first key unit 3a are able to detect depression thereof. The physical keys $3b_1$, $3b_2$ and $3b_3$ configuring the second key unit 3b are able to depression thereof. Each of the physical keys constituting the first key unit 3a and the second key unit 3b may individually detect the depression thereof. Each of the physical keys constituting the first key unit 3a and the second key unit 3b may be configured to have a surface with texture different from that of other parts of the electronic device 1. Any shape, such as a column-shape, a cuboid shape or a roof-shape, may be used for a shape of the surface of each of the physical keys constituting the first key unit 3a and the second key unit 3b. Each of the physical keys constituting the first key unit 3a and the second key unit 3b may have a configuration to enable the depression at two or more steps. The physical keys $3a_1$ to $3a_{10}$ constituting the first key unit 3a are exemplary first physical keys.

As illustrated in FIG. 4, the touch screen 3c includes a touch screen 3ca and a touch screen 3cb. The touch screen 3ca is arranged along the direction parallel to the y-axis illustrated in FIG. 4 under the first key unit 3a in such a manner that the touch screen 3ca extends in the longitudinal direction of the electronic device 1. The touch screen 3cb is arranged along the direction parallel to the x-axis illustrated in FIG. 4 under the second key unit 3b in such a manner that the touch screen 3cb extends in the transverse direction of the electronic device 1. The touch screen 3ca is able to detect contact and approach of a conductive object, such as a finger, with and to the first key unit 3a. The touch screen 3cb is able to detect contact and approach of a conductive object, such as a finger, with and to the second key unit 3b.

Figure 5:
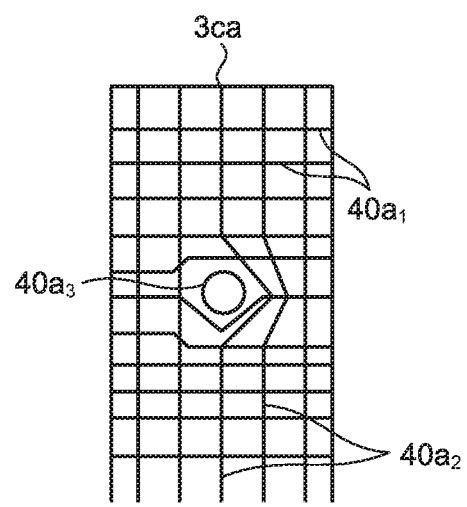
FIG. 5 is a diagram illustrating an exemplary structure of the touch screen according to the embodiments.

With reference to FIG. 5, an exemplary structure of the touch screen 3c according to the embodiments will be described. FIG. 5 is a diagram illustrating an exemplary structure of the touch screen 3c according to the embodiments. FIG. 5 illustrates a part of a structure of the touch screen 3ca out of the touch screens 3c according to the embodiment. As illustrated in FIG. 5, the touch screen 3ca includes a plurality of first electrodes $40a_1$ and a plurality of second electrodes $40a_2$. The first electrodes $40a_1$ extend in the transverse direction of the touch screen 3ca. The second electrodes $40a_2$ extend in the longitudinal direction of the touch screen 3ca. In the touch screen 3ca, the first electrodes $40a_1$ and the second electrodes $40a_2$ are arranged so as to intersect in a grid. The touch screen 3ca detects contact of, for example, a finger with or approach of the finger to the first key unit 3a at each of the positions in which the first electrodes $40a_1$ and the second electrodes $40a_2$ intersect. When a conductive object gets close to the touch screen 3ca, capacitive coupling occurs between the touch screen 3ca and the object. The touch screen 3ca detects, for example, contact of a conductive object, such as a finger, by sensing the capacitive coupling at the detection points. In the example illustrated in FIG. 4, a key hole $40a_3$ for setting the physical keys $3a_1$ to $3a_{10}$ constituting the first key unit 3a is provided. With this key hole, there is provided a region where the first electrodes $40a_1$ and the second electrodes $40a_2$ do not intersect in a grid and are not arranged uniformly. However, the detection points are calibrated in a process performed by the controller 10. The detection method of the touch screen 3c may be any method, such as a capacitance method, a resistance film method, a surface acoustic wave method, an infrared method or a load sensing method like the method of the touch screen 2B.

The controller 10 is able to determine which of the physical keys $3a_1$ to $3a_{10}$ constituting the first key unit 3a is contacted based on a result of the detection by the touch screen 3ca. The controller 10 is able to determine which of the physical keys $3a_1$ to $3a_{10}$ constituting the first key unit 3a is pressed based on a result of the detection by the first key unit 3a. The controller 10 is able to determine which of the physical keys $3b_1$, $3b_2$ and $3b_3$ constituting the second key unit 3b is contacted based on a result of the detection by the touch screen 3cb. The controller 10 is able to determine which of the physical keys $3b_1$, $3b_2$ and $3b_3$ constituting the second key unit 3b is pressed based on a result of the detection by the second key unit 3b.

When the controller 10 detects both of a touch on the physical keys constituting the first key unit 3a and a touch on the physical keys constituting the second key unit 3b via the touch screen 3c, the controller 10 is able to, for example, preferentially execute a process corresponding to the latest touch. When the controller 10 detects another touch other than the touch on the physical keys constituting the first key unit 3a and the touch on the physical keys constituting the second key unit 3b via the touch screen 2B in a state where both of the touch on the physical keys constituting the first key unit 3a and the touch on the physical keys constituting the second key unit 3b are detected, the controller 10 is able to regard the other touch other than the touch on the physical keys constituting the first key unit 3a and the touch on the physical keys constituting the second key unit 3b as an invalid touch operation. Furthermore, when the controller 10 detects both of the touch on the physical keys constituting the first key unit 3a via the touch screen 3c and the touch on the touch screen 2B, the controller 10 is able to, for example, preferentially execute a process corresponding to the latest touch. As described above, the controller 10 preferentially executes the process corresponding to the latest touch when the controller 10 detects both of the touch on the touch screen 2B and the touch on the touch screen 3c.

The controller 10 may detect, for example, a touch gesture, such as long touch, tap, double tap or slide, for the physical keys constituting the first key unit 3a and the physicals key constituting the second key unit 3b via the touch screen 3c.

The illuminance sensor 4 detects illuminance. The illuminance is a value of a flux of light incident on a unit area of a measurement surface of the illuminance sensor 4. The illuminance sensor 4 is, for example, used to adjust luminance of the display 2A.

The proximity sensor 5 enables contactless detection of presence of an object in the vicinity. The proximity sensor 5 detects the presence of an object based on, for example, a change in the magnetic field or a change in a return time of a reflective wave of ultrasound. The proximity sensor 5, for example, detects that the display 2A is moved to be close to a face. The illuminance sensor 4 and the proximity sensor 5 may be configured as a single sensor. The illuminance sensor 4 may be used as a proximity sensor.

The communicator 6 communicates wirelessly. Examples of a communication standard supported by the communicator 6 include, but are not limited to, communication standards for 2G, 3G, 4G and 5G cellular phones, communication standards for short range wireless communication, etc. Examples of cellular phone communication standards include, but are not limited to, LTE (Long Term Evolution), W-CDMA (Wideband Code Division Multiple Access), WiMAX (trademark) (Worldwide Interoperability for Microwave Access), CDMA2000, PDC (Personal Digital Cellular), GSM (trademark) (Global System for Mobile Communications), PHS (Personal Handy-phone System), etc. Examples of the wireless communication standards for short range wireless communication include, but are not limited to, IEEE802.11, Bluetooth (trademark), IrDA (Infrared Data Association), NFC (Near Field Communication), WPAN (Wireless Personal Area Network), etc. Examples of WPAN communication standards include, but are not limited to, ZigBee (trademark), etc. The communicator 6 may support at least one of the communication standards listed above.

The receiver 7 outputs, as sound, a sound signal that is transmitted from the controller 10. The receiver 7 is able to output, for example, sound of video and sound of music that are reproduced by the electronic device 1 and voice of a partner on calling. The microphone 8 converts, for example, input voice of the user into sound signals and transmit the sound signals to the controller 10.

The storage 9 stores programs and data. The storage 9 may be used as a work area in which results of processes performed by the controller 10 are temporarily stored. The storage 9 may include a semiconductor storage medium and a non-transitory storage medium, such as a magnetic storage medium. The storage 9 may include multiple types of storage media. The storage 9 may include a combination of a storage medium, such as a memory card, an optical disk or a magneto-optical disk, and a storage-medium read device. The storage 9 may include a storage device that is used as a temporary storage area, such as a random access memory (RAM).

The programs stored in the storage 9 include an application that is executed on the foreground or the background and a support program that supports operations of the application (not illustrated in the drawings). The application, for example, when executed on the foreground, displays a screen according to the application on the display 2A. The support program includes, for example, an OS. The program may be installed in the storage 9 via wireless communications by the communicator 6 or a non-transitory storage medium.

The storage 9 is able to store a control program 9A, a character input control program 9B, first key data 9C, second key data 9D, condition data 9E, setting data 9Z, etc. The control program 9A may be linked up with various types of applications stored in the electronic device 1 to provide various functions. The control program 9A may be linked up with a cloud storage via the communicator 6 and access files and data stored in the cloud storage. The cloud storage may store a part or all of the programs and data stored in the storage 9.

The control program 9A is able to provide functions for achieving processes relating to various operations of the electronic device 1. The functions provided by the control program 9A include a function of adjusting the luminance of the display 2A based on the result of detection by the illuminance sensor 4. The functions provided by the control program 9A include a function of invalidating an operation on the touch screen 2B based on the result of detection by the proximity sensor 5. The functions provided by the control program 9A include a function of realizing a calling by controlling the communicator 6, the receiver 7, the microphone 8, etc. The functions provided by the control program 9A include a function of controlling imaging process performed by the camera 12 and the camera 13. The functions provided by the control program 9A include a function of controlling communication with an external device that is connected via the connector 14. The functions provided by the control program 9A include a function of performing various types of control to, for example, change information displayed on the display 2A according to the gesture that is determined based on the result of the detection by the touch screen 2B. The functions provided by the control program 9A include a function of detecting movement or stop of the user who carries the electronic device 1 according to the result of detection by the motion sensor 15.

The character input control program 9B is able to provide a function for controlling character input executed by the electronic device 1. When operations on, for example, the first key unit 3a, the second key unit 3b and the touch screen 2B are detected, the character input control program 9B is able to provide a function of executing a process based on information that is associated with the physical keys and software keys/virtual keys on which the operations are detected. The character input control program 9B is able to provide a function of reading out information to be read out. The character input control program 9B is able to provide a function of allocating characters to at least one of the first key unit 3a and the software keys according to the keyboard layout.

The first key data 9C contains information on rows of a keyboard allocated to the first key unit 3a and sets of software keys displayed in the touch screen display 2. The second key data 9D contains information on characters and words of the rows of the keyboard allocated to the first key unit 3a and sets of software keys displayed in the touch screen display 2.

The first key data 9C and the second key data 9D contain information representing a keyboard layout corresponding to a given keyboard in the electronic device. The first key data 9C contains information corresponding to each row of the keyboard. The second key data 9D contains information on the multiple keys each of which corresponding to each row of the first key data 9C. Combining the information corresponding to each row of the keyboard of the first key data 9C and the information on the multiple keys each of which corresponding to each row of the first key data 9C of the second key data 9D achieves the keys contained in the given keyboard in the electronic device. The keyboard layout of the embodiments includes the QWERTY layout. Examples of the keyboard layout include, but are not limited to, the Dvorak layout, the French AZERTY layout, the German QWERTZ layout, etc.

With reference to FIGS. 6 and 7, the exemplary first key data 9C and the second key data 9D will be described. FIG. 6 is a table representing exemplary first key data. FIG. 7 is a table representing exemplary second key data. FIGS. 6 and 7 represent exemplary data of the QWERTY layout. The first key data 9C contains information on the rows of the keyboard allocated to the first key unit 3a and the sets of the software keys displayed in the touch screen display 2. A row containing keys of "q", "w", "e", "r", "t", "y", "u", "i", "o" and "p" (called "q-row") that is one of the rows of the QWERTY layout corresponds to an array 1 (a first row) in the first key data 9C. A row containing "a", "s", "d", "f", "g", "h", "j", "k" and "l" (called "a-row") that is one of the rows of the QWERTY layout corresponds to an array 2 (a second row) in the first key data 9C. A row containing "shift", "z", "x", "c", "v", "b", "n", "m" and "delete" (called "z-row") that is one of the rows of the QWERTY layout corresponds to an array 3 (a third row) in the first key data 9C.

The second key data 9D contains information on characters and words of the rows of the keyboard allocated to the first key unit 3a and sets of software keys displayed in the touch screen display 2. The characters and words allocated to each of the physical keys and the software keys serve as possible inputs. Each of the characters "q", "w", "e", "r", "t", "y", "u", "i", "o" and "p" of the q-row as the array 1 in the first key data 9C is allocated to each of the physical keys and the software keys. Each of the characters "a", "s", "d", "f", "g", "h", "j", "k" and "l" of the a-row as the array 2 in the first key data 9C is allocated to each of the physical keys and the software keys. Each of the characters and words "shift", "z", "x", "c", "v", "b", "n", "m" and "delete" of the z-row as the array 3 in the first key data 9C is allocated to each of the physical keys and the software keys. In the second key data 9D of the embodiment, no character is allocated to an element 10 of the array 1 and array 3. For example, the second key data 9D is used to execute an output process corresponding to each of the physical keys and the software keys in the character input process, which will be described later.

The embodiment illustrates the case where, in the second key data 9D, the keys of "shift" and "delete" are allocated as the element 1 of the array 3 and the element 9 of the array 3, respectively; however, the embodiments are not limited thereto. For example, in the second key data 9D, the keys of "shift" and "delete" need not be allocated as the allocated words. In other words, in the second key data 9D, only the characters "z", "x", "c", "v", "b", "n" and "m" may be allocated to the elements 1 to 7 of the array 3.

The embodiment illustrates the case where the keyboard layout of the lowercase characters of the QWERTY layout is allocated to the first key data 9C and the second key data 9D in the electronic device; however, the embodiments are not limited thereto. For example, the electronic device 1 may allocate the keyboard layout of the capital characters of the QWERTY layout to the first key data 9C and the second key data 9D.

The embodiment illustrates the case where the first key data 9C and the second key data 9D represent the keyboard layout of the three rows; however, the embodiments are not limited thereto. For example, the second key data 9D may represent a keyboard layout of more than four rows. For example, the QWERTY layout has a row in which numbers "1", "2", "3", "4", "5", "6", "7", "8", "9" and "0" are arrayed. In this case, the first key data 9C and the second key data 9D may contain information representing a fourth row containing the numbers "1" to "0". For example, when a keyboard layout of the lowercase characters of the QWERTY layout is allocated to the first to third rows in the first key data 9C and the second key data 9D, a keyboard layout of the capital characters of the QWERTY layout may be allocated to fourth to sixth rows. In this case, in the second key data 9D, the characters "Q", "W", "E", "R", "T", "Y", "U", "I", "O" and "P" are allocated to each of the elements 1 to 10 of the fourth row. For example, when at least one of the first key unit 3a and the second key unit 3b includes more than ten keys, the second key data 9D may contain elements 11 to n, where n is an integer larger than 11.

In the condition data 9E, various conditions to execute processes by using the character input control program 9B are set. Specifically, in the condition data 9E, a condition for starting the character input process of the character input control program 9B, a condition for ending the character input process, etc., are set.

The setting data 9Z contains information used for processes executed by the control program 9A. The setting data 9Z contains information representing a relationship between the arrays of the first key data 9C and the key types. Examples of the key types include, but are not limited to, the types of the first key unit 3a, the second key unit 3b and the software keys, etc. The information representing the relationship between the arrays of the first key data 9C and the key types may be set according to the frequency of use of each of the arrays, operability, etc.

The controller 10 includes an arithmetic processing device. Examples of the arithmetic processing device include, but are not limited to, a central processing unit (CPU), a system-on-a-chip (SoC), a micro control unit (MCU), a field-programmable gate array (FPGA), a coprocessor, etc. The controller 10 integrally controls operations of the electronic device 1 to implement various functions.

Specifically, the controller 10 is able to execute commands that are contained in the programs stored in the storage 9. The controller 10 is able to refer to the data stored in the storage 9 when necessary. The controller 10 controls a function module according to the data and commands. The controller 10 implements various functions by controlling the function module. Examples of the function module include, but are not limited to, the display 2A, the communicator 6, the microphone 8, the speaker 11, etc. The controller 10 may change the control according to result of detection by a detection module. Examples of the detection module include, but are not limited to, the touch screen 2B, the physical key unit 3, the illuminance sensor 4, the proximity sensor 5, the microphone 8, the camera 12, the camera 13, the motion sensor 15, etc.

By executing the control program 9A, the controller 10 is able to achieve processes relating to various operations of the electronic device 1.

By executing the character input control program 9B, the controller 10 is able to achieve process of controlling the character input that is executed by the electronic device 1. For example, by executing the character input control program 9B, the controller 10 is able to achieve process in which at least one of a set of physical keys or a set of software keys is used as a keyboard of the QWERTY layout. The controller 10 is an exemplary controller.

The speaker 11 outputs, as sound, a sound signal that is transmitted from the controller 10. The speaker 11 is used to output, for example, ringtone and music. One of the receiver 7 and the speaker 11 may work as the other.

The camera 12 and the camera 13 convert a captured image into electronic signals. The camera 12 is a front side camera that images an object facing the display 2A. The camera 13 is a rear side camera that images an object facing the face opposite to the display 2A. The camera 12 and the camera 13 may be integrated functionally and physically to be mounted on the electronic device 1 as one camera unit switchable for the front side camera and the rear side camera.

The connector 14 is a terminal to which another device is connected. The connector 14 may be a general-purpose terminal, such as a universal serial bus (USB), a high-definition multimedia interface (HDMI) (trademark), light peak (thunderbolt) (trademark) or an earphone/microphone connector. The connector 14 may be a dedicated terminal, such as a Dock connector. Examples of the device connected to the connector 14 include, but are not limited to, an external storage, a speaker, a communication device, etc.

The motion sensor 15 is able to detect various types of information for determining motion of the user who carries the electronic device 1. The motion sensor 15 may be configured as a sensor unit including an acceleration sensor, an orientation sensor, a gyroscope, a magnetic sensor and an atmospheric pressure sensor.

The electronic device 1 may include, in addition to the above-described various function modules, a GPS receiver and a vibrator. The GPS receiver receives radio signals in a given frequency band from GPS satellites. The GPS receiver performs a process of demodulating a received radio signal and transmits the processed signal to the controller 10. The GPS receiver supports the process of computing the current position of the electronic device 1. The electronic device 1 may include a receiver that is able to receive a signal of a positioning satellite other than GPS satellites to execute process of computing the current position. The vibrator vibrates a part or the whole of electronic device 1. The vibrator includes, for example, a piezoelectric element or an eccentric motor in order to cause vibrations. The electronic device 1 mounts a function module that is used inevitably to maintain the functions of the electronic device 1, such as a battery, and a controller that is used inevitably to achieve the control on the electronic device 1.

The electronic device 1 may access a storage server on the cloud via the communicator 6 and acquire various types of programs and data.

Figure 8:
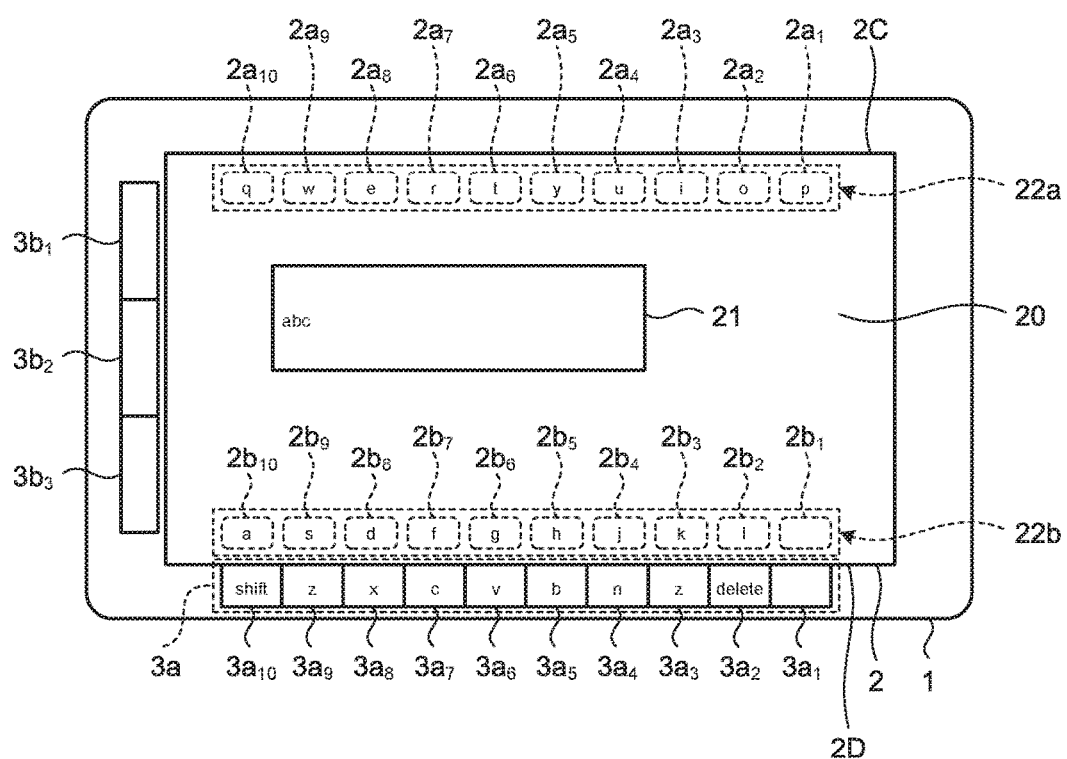
FIG. 8 is a diagram illustrating an exemplary keyboard layout configuration according to the embodiments.
Figure 9:
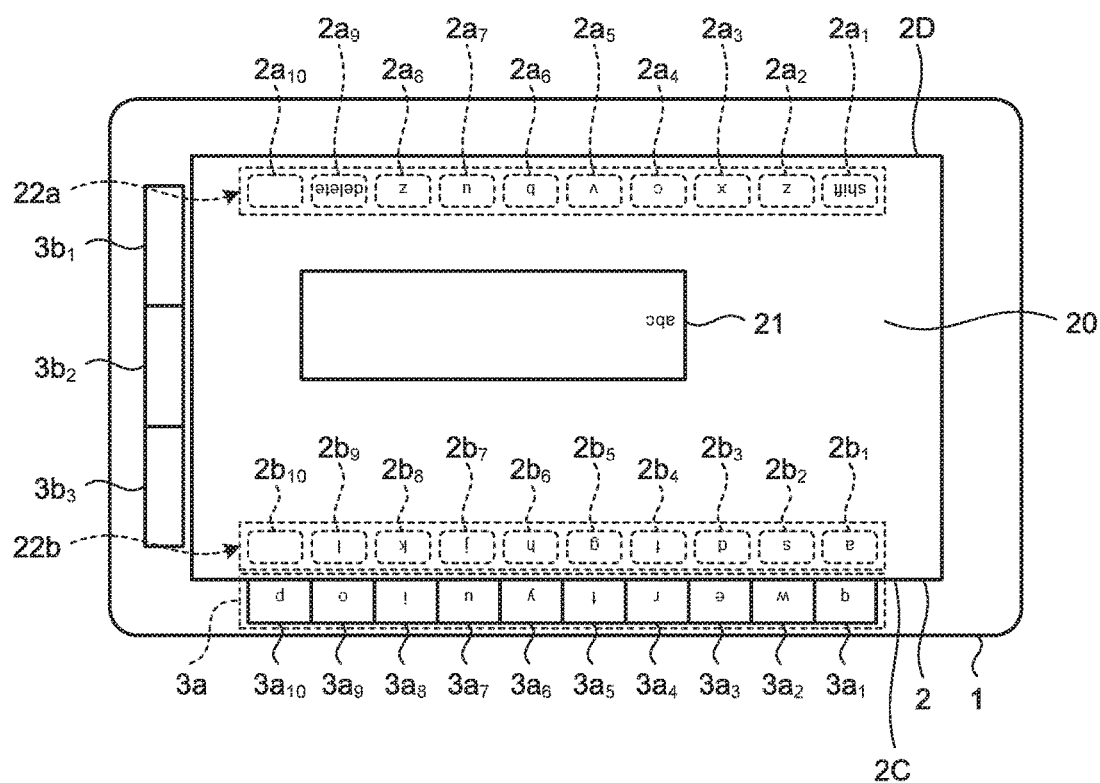
FIG. 9 is a diagram illustrating another exemplary keyboard layout configuration according to the embodiments.

With reference to FIGS. 8 and 9, an exemplary key configuration used for the character input process performed by the electronic device 1 according to the embodiments will be described. FIGS. 8 and 9 are diagrams illustrating exemplary key configurations according to the embodiments. The examples illustrated in FIGS. 8 and 9 represent exemplary cases where the user uses the electronic device 1 horizontally. The example illustrated in FIG. 9 represents a case where the horizontal direction of the electronic device 1 is opposite to that of the electronic device 1 illustrated in FIG. 8.

First of all, the example illustrated in FIG. 8 will be described. When executing the character input process, the electronic device 1 displays a screen 20 illustrated in FIG. 8 on the display 2A. The screen 20 includes a text display area 21, a first key area 22a and a second key area 22b. In the text display area 21, it is possible to display, for example, characters or a character array that is input by performing the character input process. According to FIG. 8, a side 2C as a second edge is a top side of the screen and a side 2D as a first edge is a bottom side of the screen.

The first key area 22a and the second key area 22b are provided in a position in which the first key area 22a and the second key area 22b overlap the touch screen 2B. The first key area 22a is provided along the side 2C of the touch screen display 2 and is adjacent to the side 2C. The side 2C of the touch screen display 2 is a side opposite to the side on which the first key unit 3a is provided. The second key area 22b is provided along the side 2D of the touch screen display 2 and is adjacent to the side 2D. The side 2D of the touch screen display 2 is the same side as the side on which the first key unit 3a is provided. That is, the second key area 22b and the first key unit 3a are adjacent to each other. In the first key area 22a, a plurality of third keys $2a_1$, $2a_2$, $2a_3$, $2a_4$, $2a_5$, $2a_6$, $2a_7$, $2a_8$, $2a_9$ and $2a_{10}$ as a plurality of second software keys are displayed. The third keys $2a_1$, $2a_2$, $2a_3$, $2a_4$, $2a_5$, $2a_6$, $2a_7$, $2a_8$, $2a_9$ and $2a_{10}$ according to the embodiment are arranged along the side 2C in a row from the right of the screen 20 to the left. That is, the third keys $2a_1$, $2a_2$, $2a_3$, $2a_4$, $2a_5$, $2a_6$, $2a_7$, $2a_8$, $2a_9$ and $2a_{10}$ are arranged sequentially from one end opposite to the other end at which the second key unit 3b is arranged. Each of the third keys $2a_1$, $2a_2$, $2a_3$, $2a_4$, $2a_5$, $2a_6$, $2a_7$, $2a_8$, $2a_9$ and $2a_{10}$ corresponds to an area obtained by dividing the first key area 22a in a horizontal direction from the right of the screen 20 to the left in FIG. 8. In the following descriptions, the third keys $2a_1$, $2a_2$, $2a_3$, $2a_4$, $2a_5$, $2a_6$, $2a_7$, $2a_8$, $2a_9$ and $2a_{10}$ will be referred to as third keys 2a when they are not distinguished from one another. In the second key area 22b, a plurality of fourth keys $2b_1$, $2b_2$, $2b_3$, $2b_4$, $2b_5$, $2b_6$, $2b_7$, $2b_8$, $2b_9$ and $2b_{10}$ as a plurality of first software keys are displayed. The fourth keys $2b_1$, $2b_2$, $2b_3$, $2b_4$, $2b_5$, $2b_6$, $2b_7$, $2b_8$, $2b_9$ and $2b_{10}$ according to the embodiment are arranged in a row from the right side of the screen 20 to the left side along the side 2D. That is, the fourth keys $2b_1$, $2b_2$, $2b_3$, $2b_4$, $2b_5$, $2b_6$, $2b_7$, $2b_8$, $2b_9$ and $2b_{10}$ are arranged sequentially from one end opposite to the other end at which the second key unit 3b is arranged. Each of the fourth keys $2b_1$, $2b_2$, $2b_3$, $2b_4$, $2b_5$, $2b_6$, $2b_7$, $2b_8$, $2b_9$ and $2b_{10}$ corresponds to an area obtained by dividing the second key area 22b in a horizontal direction from the right side of the screen 20 to the left side in FIG. 8. In the following descriptions, the fourth keys $2b_1$, $2b_2$, $2b_3$, $2b_4$, $2b_5$, $2b_6$, $2b_7$, $2b_8$, $2b_9$ and $2b_{10}$ will be referred to as fourth keys 2b when they are not distinguished from one another. It is possible to allocate each of the characters of the elements 1 to 10 of the arrays in the second key data 9D to each of the third keys 2a and the fourth keys 2b of the embodiment. It is possible to display the allocated characters on the third keys 2a and the fourth keys 2b. The third keys 2a and the fourth keys 2b function as software keys arranged on the touch screen display 2. Arranging the third keys 2a along the side 2C enables a user to choose and operate the third key 2a by moving, for example, a finger along the side 2C. Arranging the fourth keys 2b along the side 2D enables a user to choose and operate the fourth key 2b by moving, for example, a finger along the side 2D.

By executing the character input process, the electronic device 1 allocates the characters of the QWERTY layout to the physical keys of the first key unit 3a, the third keys 2a in the first key area 22a, and the fourth keys 2b in the second key area, respectively. For example, the electronic device 1 allocates the characters that are allocated to the elements 1 to 10 of the array 1/first row in the second key data 9D to the third keys $2a_{10}$, $2a_9$, $2a_8$, $2a_7$, $2a_6$, $2a_5$, $2a_4$, $2a_3$, $2a_2$ and $2a_1$ in the first key area 22a, respectively. The electronic device 1 allocates the characters that are allocated to the elements 1 to 9 of the array 2/second row in the second key data 9D to the fourth keys $2b_{10}$, $2b_9$, $2b_8$, $2b_7$, $2b_6$, $2b_5$, $2b_4$, $2b_3$ and $2b_2$ in the second key area 22b, respectively. The electronic device 1 allocates the characters that are allocated to the elements 1 to 9 of the array 3/third row in the second key data 9D to the physical keys $3a_{10}$, $3a_9$, $3a_8$, $3a_7$, $3a_6$, $3a_5$, $3a_4$, $3a_3$ and $3a_2$ of the first key unit 3a, respectively.

Specifically, the electronic device 1 allocates the characters "q", "w", "e", "r", "t", "y", "u", "i", "o" and "p" to the third keys $2a_{10}$, $2a_9$, $2a_8$, $2a_7$ $2a_6$, $2a_5$, $2a_4$, $2a_3$, $2a_2$ and gal as the plurality of the second software keys, respectively, on the screen 20 and displays thereon images representing the corresponding characters, respectively. The electronic device 1 allocates the characters "a", "s", "d", "f", "g", "h", "j", "k" and "l" to the fourth keys $2b_{10}$, $2b_9$, $2b_8$, $2b_7$, $2b_6$, $2b_5$, $2b_4$, $2b_3$ and $2b_2$ as the plurality of the first software keys, respectively, and displays thereon images representing the corresponding characters, respectively. The electronic device 1 allocates the characters and words "shift", "z", "x", "c", "v", "b", "n", "m" and "delete" to the physical keys $3b_{10}$, $3b_9$, $3b_8$, $3b_7$, $3b_6$, $3b_5$, $3b_4$, $3b_3$ and $3b_2$ of the first key unit 3a, respectively. That is, the electronic device 1 allocates the characters and the words to each of the keys in the electronic device 1 in the same orientation and the same order as those of the keyboard, according to an orientation of the screen.

As described above, in the exemplary electronic device 1 illustrated in FIG. 8, the third keys 2a in the first key area 22a, the fourth keys 2b in the second key area 22b, and the physical keys 3a of the first key unit 3a are arranged in this order from the top side in the character display direction. The electronic device 1 allocates the keys of the first row in the second key data 9D to the third keys 2a in the first key area 22a, allocates the keys of the second row in the second key data 9D to the fourth keys 2b in the second key area 22b, and allocates the keys of the third row in the second key data 9D to the physical keys 3a of the first key unit 3a.

In the example illustrated in FIG. 8, the characters and words allocated to the respective keys are represented in order to represent a relationship between the keys and the allocated characters and words; however, the electronic device 1 practically does not display the characters and words allocated to the first key unit 3a. When a provisionally choosing operation on the first key unit 3a is detected, the electronic device 1 has a function of reading out the character and word allocated to the key on which the provisional choosing operation is detected. Examples of the provisionally choosing operation include, but are not limited to, touch, tap, etc., on, for example, the physical keys and software keys. For example, in the case illustrated in FIG. 8, when the provisionally choosing operation on the physical key $3a_3$ is detected, the electronic device 1 outputs a reading voice corresponding to a character "z" that is allocated to the physical key $3a_3$ from the speaker 11. In the electronic device 1, the physical key unit 3a may be provided with a display function. Furthermore, the reading-out function may be enabled with the display function. The electronic device 1 according to the embodiments enables the reading-out function for the software keys; however, the reading-out function need not be enabled for the software keys.

The example illustrated in FIG. 8 illustrates the case where, when the amount of the characters and words allocated to the physical keys of the first key unit $3a$ is smaller than the amount of the physical keys, the electronic device 1 allocates the characters and words closely from the physical key $3a_{10}$ (the side on which the second key unit $3b$ is arranged); however, the embodiments are not limited thereto. For example, when the amount of the characters and words to be allocated is smaller than the amount of the physical keys, the electronic device 1 may allocate the characters and words closely from the physical key $3a_1$. For example, when the amount of characters and words to be allocated is smaller than the amount of the physical keys by at least two, the electronic device 1 need no allocate characters and words to the physical keys $3a_1$ and $3a_{10}$. The same applies to the case where the amount of characters and words to be allocated to the third keys $2a$ in the first key area $22a$ or to the fourth keys $2b$ in the second key area $22b$ is smaller than the amount of the third keys $2a$ in the first key area $22a$ or the fourth keys $2b$ in the second key are $22b$.

The example illustrated in FIG. 9 will be described. The side 2D as a second edge in FIG. 9 serves as a top side of the screen and the side 2C as a first edge serves as a bottom side of the screen. The screen 20 illustrated in FIG. 9 also includes the text display area 21, the first key area $22a$ and the second key area $22b$.

By executing the character input process, the electronic device 1 allocates the characters of the QWERTY layout to the physical keys of the first key unit $3a$, the third keys $2a$ in the first key area $22a$, and the fourth keys $2b$ in the second key area $22b$, respectively, according to the first key data 9C and the second key data 9D. When the screen is displayed in an orientation such that the side 2D is a top side of the screen and the side 2C is a bottom side of the screen as illustrated in FIG. 9, the electronic device 1 allocates the characters "q", "w", "e", "r", "t", "y", "u", "i", "o" and "p" to the physical keys $3a_1$, $3a_2$, $3a_3$, $3a_4$, $3a_5$, $3a_6$, $3a_7$, $3a_8$, $3a_9$ and $3a_{10}$ of the first key unit $3a$, respectively. The electronic device 1 allocates the characters "a", "s", "d", "f", "g", "h", "j", "k" and "l" to the fourth keys $2b_1$, $2b_2$, $2b_3$, $2b_4$, $2b_3$, $2b_6$, $2b_7$, $2b_8$ and $2b_9$ as the plurality of the first software keys on the screen 20 and displays thereon images representing the corresponding characters, respectively. The electronic device 1 allocates the characters and words "shift", "z", "x", "c", "v", "b", "n", "m" and "delete" to the third keys $2a_1$, $2a_2$, $2a_3$, $2a_4$, $2a_5$, $2a_6$, $2a_7$, $2a_8$ and $2a_9$ as the plurality of the second software keys on the screen 20 and displays thereon images representing the corresponding characters and words, respectively. That is, the electronic device 1 allocates the characters and the words to each of the keys in the electronic device 1 in the same orientation and the same order as those of the keyboard, according to an orientation of the screen. The orientation of the characters and words displayed on the screen 20 illustrated in FIG. 9 is opposite to that on the screen 20 illustrated in FIG. 8. Thus, the orientation of the characters and words displayed on the software keys on the screen 20 illustrated in FIG. 9 is opposite to that of the software keys on the screen 20 illustrated in FIG. 8.

As described above, in the exemplary electronic device 1 illustrated in FIG. 9, the physical keys of the first key unit $3a$, the fourth keys $2b$ in the second key area $22b$, the third keys $2a$ in the first key area $22a$ are arranged in this order from the top side in the character display direction. The electronic device 1 allocates the keys of the first row in the second key data 9D to the physical keys of the first key unit $3a$, allocates the keys of the second row in the second key data 9D to the fourth keys $2b$ in the second key area $22b$, and allocates the keys of the third row in the second key data 9D to the third keys $2a$ in the first key area $22a$. As described above, the electronic device 1 is able to change the row of the keyboard to be allocated to each of the first key unit $3a$, the set of the third keys $2a$ in the first key area $22a$ and the set of the fourth keys $2b$ in the second key area $22b$ according to the orientation of the screen.

Figure 10:
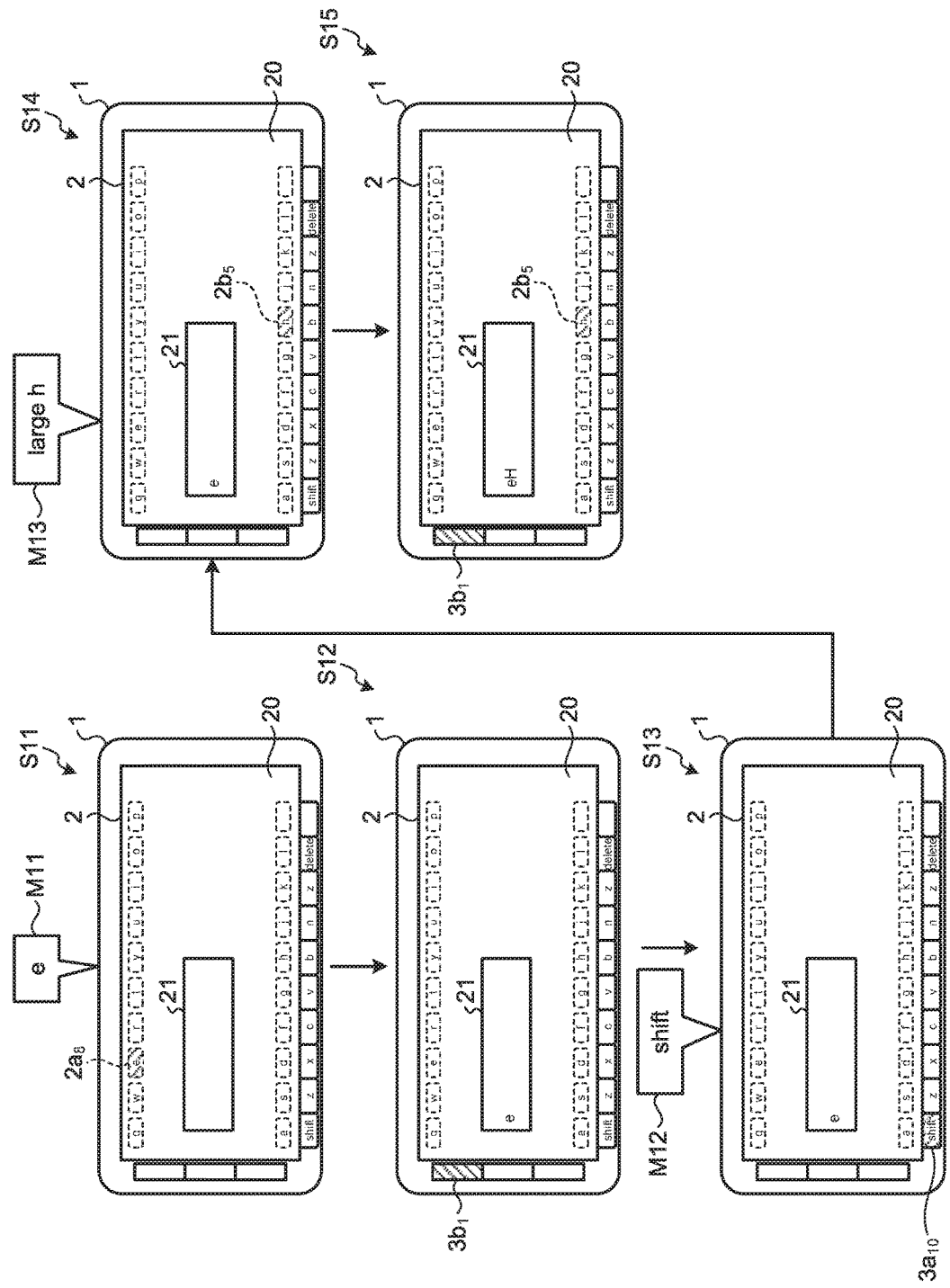
FIG. 10 is a diagram for explaining an exemplary character input process according to the embodiments.

FIG. 10 is a diagram for explaining an exemplary character input process according to the embodiments. With reference to FIGS. 8 and 10, the exemplary control on the character input process performed by the electronic device 1 will be described. For example, in the setting data 9Z, the first, second and third rows represented by the first key data 9C correspond to the first key unit $3a$, the set of the third keys $2a$ in the first key area $22a$ and the set of the fourth keys $2b$ in the second key area $22b$, respectively. In this case, when the character input control program 9B is executed, the electronic device 1 allocates the characters and words of the rows represented by the first key data 9C and the second key data 9D to the first key unit $3a$, the third keys $2a$ and the fourth keys $2b$. The electronic device 1 displays the screen 20 containing the third keys $2a$ and the fourth keys $2b$ on the touch screen display 2.

The user performs a provisionally choosing operation on the key $2a_8$ in the first key area $22a$ at Step S11 illustrated in FIG. 10. When the provisionally choosing operation on the key $2a_8$ in the first key area $2a$ is detected via the touch screen 2B at Step S11, the electronic device 1 executes an output process corresponding to the key $2a_8$. Specifically, the electronic device 1 outputs a read sound M11 of the character "e" that is allocated to the key $2a_8$ from the speaker 11. In this case, the electronic device 1 turns the key $2a_8$ into a provisionally chosen state.

At Step S12, the user performs a determining operation on the key $2a_8$ in the first key area $22a$. Examples of the determining operation include, but are not limited to, operations, such as pressing the second key unit $3b$ in a state where the key $2a_8$ in the first key area $22a$ is provisionally chosen or long-touching thereto, etc. At Step S12, when the determining operation on the physical key $3b_1$ of the second key unit $3b$ is detected via the touch screen $3c$, the electronic device 1 fixes the input of the character "e" that is allocated to the key $2a_8$ in the first key area $22a$ and displays the character "e" in the text display area 21.

At Step S13, the user performs the provisionally choosing operation on the physical key $3a_{10}$ of the first key unit $3a$. At Step S13, when the provisionally choosing operation on the physical key $3a_{10}$ of the first key unit $3a$ is detected via the touch screen $3c$, the electronic device 1 executes an output process corresponding to the physical key $3a_{10}$. Specifically, the electronic device 1 outputs a reading voice M12 of the word "shift" allocated to the physical key $3a_{10}$ from the speaker 11. In this case, the electronic device 1 turns the physical key $3a_{10}$ into the provisionally chosen state.

At Step S14, the user performs the provisionally choosing operation on the fourth key $2b_5$ in the second key area $22b$. At Step S14, when the provisionally choosing operation on the fourth key $2b_5$ in the second key area $22b$ is detected via the touch screen 2B, the electronic device 1 executes an output process corresponding to the fourth key $2b_5$ in the second key area $22b$. Specifically, as the physical key $3a_{10}$ is provisionally chosen and the character "h" is allocated to the fourth key $2b_5$, the electronic device 1 outputs, for example, a reading voice M13 of "large h" from the speaker 11. In this case, the electronic device 1 turns the physical key $3a_{10}$ and the fourth key $2b_5$ in the second key area 22b into the provisionally chosen state.

At Step S15, the user performs the determining operation on the physical key $3b_1$ of the second key unit 3b in a state where the provisionally choosing operation on the physical key $3a_{10}$ of the first key unit 3a and the fourth key $2b_5$ in the second key area 22b is maintained. At Step S15, when the determining operation on the physical key $3b_1$ of the second key unit 3b is detected via the touch screen 3c, the electronic device 1 fixes the input of the character "h" allocated to the fourth key $2b_5$ as a capital character "H". The electronic device 1 displays the characters "eH" in the text display area 21.

The example illustrated in FIG. 10 is the case where one of the fourth keys 2b is operated. The same applies to a case where one of the physical keys 3a and the third keys 2a is operated. With respect to the example illustrated in FIG. 10, the case has been described where, in order to enable input of a capital character, the electronic device 1 let the user to operate one of the fourth keys 2b in the state where the user maintains the provisionally choosing operation on the physical key $3a_{10}$ to which the shift function is allocated; however, the embodiments are not limited thereto. For example, in order to enable input of a capital character, the electronic device 1 may let the user to operate one of the fourth keys 2b without requiring the user to maintain the provisionally choosing operation on the physical key $3a_{10}$ to which the shift function is allocated. In this case, it is satisfactory if the user releases the finger from the physical key $3a_{10}$ after performing the provisionally choosing operation on the physical key $3a_{10}$ and performs an operation on one of the fourth keys 2b with the released finger.

The example illustrated in FIG. 10 illustrates the case where, in order to enable input of a capital character, the electronic device 1 let the user to perform an operation on the physical key $3a_{10}$ to which shift is allocated and then let the user to operate one of the fourth keys 2b; however, the embodiments are not limited thereto. For example, in order to enable input of a capital character, the electronic device 1 may, first of all, let the user to operate one of the fourth keys 2b and then let the user to operate the physical key $3a_{10}$ to which shift is allocated. For example, when the operation on one of the fourth keys 2b is maintained and the operation on the physical key $3a_{10}$ to which shift is allocated is detected, the electronic device 1 may enable input of the capital character of the character allocated to each of the fourth keys 2b. For example, the electronic device 1 may enable input of the capital character of the character allocated to each of the fourth keys 2b when the operation on one of the fourth keys 2b is detected and the operation on the physical key $3a_{10}$ to which shift is allocated is detected within a predetermined time.

The example illustrated in FIG. 10 illustrates the case where the electronic device 1 allocates the shift function to the physical key $3a_{10}$; however, the embodiments are not limited thereto. For example, the electronic device 1 may allocate the shift function not to the physical key $3a_{10}$ but to any one of the physical keys of the second key unit 3b. For example, when the shift function is allocated to the physical key $3b_2$, the electronic device 1 may let the user to perform the operation on the physical key $3b_2$ to which shift is allocated and then let the user to operate one of the fourth keys 2b. For example, when the shift function and the determining function are allocated to the physical key $3b_2$, the electronic device 1 may, first of all, let the user to operate one of the fourth keys 2b and then let the user to perform the operation on the physical key $3b_2$ to which the shift function is allocated. In this case, when the operation on the physical key $3b_2$ to which the shift function and the determining function are allocated is detected, the electronic device 1 is able to fix the input of the capital character. Accordingly, after operating the physical key $3b_2$, the user need not perform any operation on another physical key to perform the determining operation.

In the above-described manner, the electronic device 1 is able to allocate the characters and words representing the QWERTY layout to the first key unit 3a with the physical keys, the third keys 2a which are the software keys, and the fourth keys 2b which are the software keys. As a result, the user is able to estimate a position of each of the keys of the QWERTY layout based on the first key unit 3a, the third keys 2a and the fourth keys 2b that are arranged along the sides of the housing 1h. In other words, arranging keys along each edge of the touch screen 2B and the housing 1h enables the user to easily know the position of each row. Accordingly, the electronic device 1 enables the user to recognize the positions of the keys of the QWERTY layout easily and accordingly makes it possible to improve operability in inputting characters by using the keys of the QWERTY layout. Furthermore, the electronic device 1 notifies by sound the user of the characters and words that are allocated to the physical keys of the first key unit 3a, the third keys 2a and the fourth keys 2b and thus enables the user to accurately understand which key is chosen.

Figure 11:
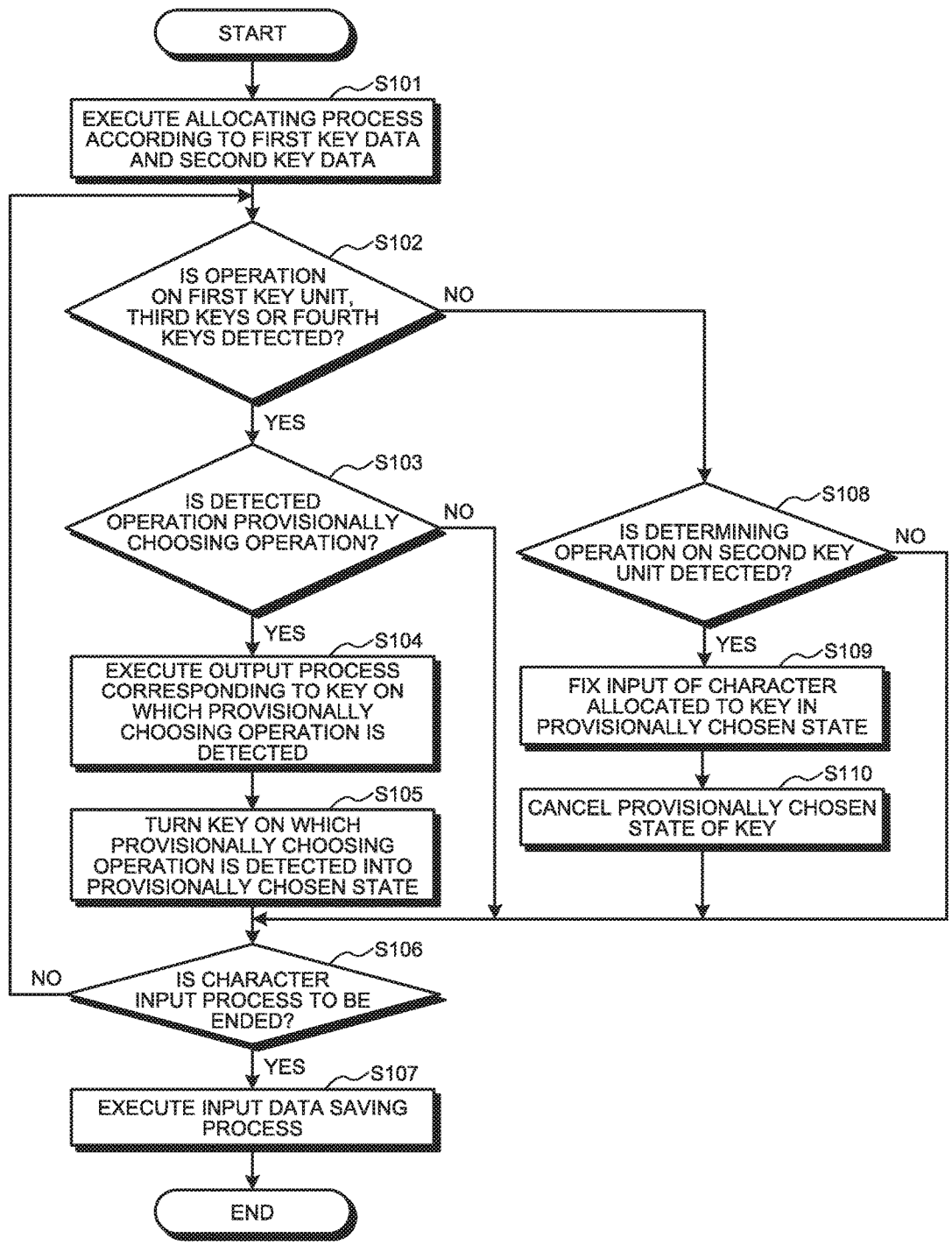
FIG. 11 is a flowchart illustrating a process procedure of exemplary control performed by the electronic device according to the embodiments.

FIG. 11 is a flowchart illustrating an exemplary process procedure of control performed by the electronic device 1 according to the embodiments. The process procedure illustrated in FIG. 11 is implemented by the controller 10 by executing the character input control program 9B. The process procedure illustrated in FIG. 11 is a process that is executed by the controller 10 in a state where the user requests a character input process.

As illustrated in FIG. 11, the controller 10 of the electronic device 1 executes an allocating process according to the first key data 9C and the second key data 9D (Step S101). For example, when the allocating process is executed, the controller 10 specifies the correspondence relationship between the rows in the first key data 9C and the first key unit 3a, the third keys 2a and the fourth keys 2b according to the setting data 9Z. The controller 10 allocates the characters of the array represented by the rows in the first key data 9C to the first key unit 3a, the third keys 2a and the fourth keys 2b, respectively, according to the specified correspondence relationship. The controller 10 then displays images representing the characters allocated to the third keys 2a and the fourth keys 2b on the third keys 2a and the fourth keys 2b, respectively. When the allocating process ends, the controller 10 proceeds to Step S102.

The controller 10 determines whether an operation on the first key unit 3a, the third keys 2a or the fourth keys 2b is detected based on a result of detection by the touch screen 2B and the touch screen 3c (Step S102). When it is determined that the provisionally choosing operation on the first key unit 3a, the third key 2a or the fourth key 2b is detected (YES at Step S102), the controller 10 proceeds to Step S103.

The controller 10 determines whether the detected operation is the provisionally choosing operation (Step S103). For example, when the detected operation is an operation such as touch or tap on the first key unit 3a, the third key 2a or the fourth key 2b, the controller 10 determines that the detected operation is the provisionally choosing operation. When it is determined that the detected operation is not the provisionally choosing operation (NO at Step S103), the controller 10 proceeds to Step S106, which will be described later. When it is determined that the detected operation is the provisionally choosing operation (YES at Step S103), the controller 10 proceeds to Step S104.

The controller 10 executes an output process corresponding to the key on which the provisionally choosing operation is detected (Step S104). The output process includes, for example, a process performed by the controller 10 to output reading voice of the character allocated to the key on which the provisionally choosing operation is detected from the speaker 11. The output process includes, for example, a process performed by the controller 10 to, when the key on which the provisionally choosing operation is detected is one of the third keys 2a or the fourth keys 2b, change the display mode of the corresponding key that is one of the third keys 2a or the fourth keys 2b. When the output process ends, the controller 10 turns the key on which the provisionally choosing operation is detected into the provisionally chosen state (Step S105). The key on which the provisionally choosing operation is detected is a key among the physical keys of the first key unit 3a, the third keys 2a, or the fourth keys 2b on which the provisionally choosing operation is detected.

The controller 10 determines whether to end the character input process (Step S106). For example, when a ending operation of the character input process or an end timing is detected, the controller 10 determines to end the character input process. When the controller 10 determines not to end the character input process (NO at Step S106), the controller 10 returns to Step S102, which is already described. When the controller 10 determines to end the character input process (YES at Step S106), the controller 10 proceeds to Step S107.

The controller 10 executes an input data saving process (Step S107). For example, the input data saving process includes a process performed by the controller 10 to store input data in the storage when the user wants to save the input data. For example, the input data saving process includes a process performed by the controller 10 to delete the input data when the user does not want to save the input data. For example, the input data saving process includes a process performed by the controller 10 to cause the display 2A to clear the screen displayed thereon. When the input data saving process ends, the controller 10 ends the process procedure illustrated in FIG. 11.

When it is determined that the provisionally choosing operation on the first key unit 3a, the third keys 2a, or the fourth keys 2b is not detected (NO at Step S102), the controller 10 proceeds to Step S108. The controller 10 determines whether the determining operation on the second key unit 3b is detected based on a result of detection by the touch screen 3c (Step S108). For example, when an operation such as press or long touch on the second key unit 3b is detected, the controller 10 determines that the detected operation is the determining operation. When it is determined that the determining operation on the second key unit 3b is not detected (NO at Step S108), the controller 10 proceeds to Step S106 which is already described. When it is determined that the determining operation on the second key unit 3b is detected (YES at Step S108), the controller 10 proceeds to Step S109.

The controller 10 fixes the input of the character allocated to the key in the provisionally chosen state (Step S109). For example, the controller 10 is able to temporarily store the fixed character as input data in the storage 9. The controller 10 then cancels the provisionally chosen state of the key (Step S110). When the provisionally chosen state of the key is canceled, the controller 10 proceeds to Step S106.

Figure 12:
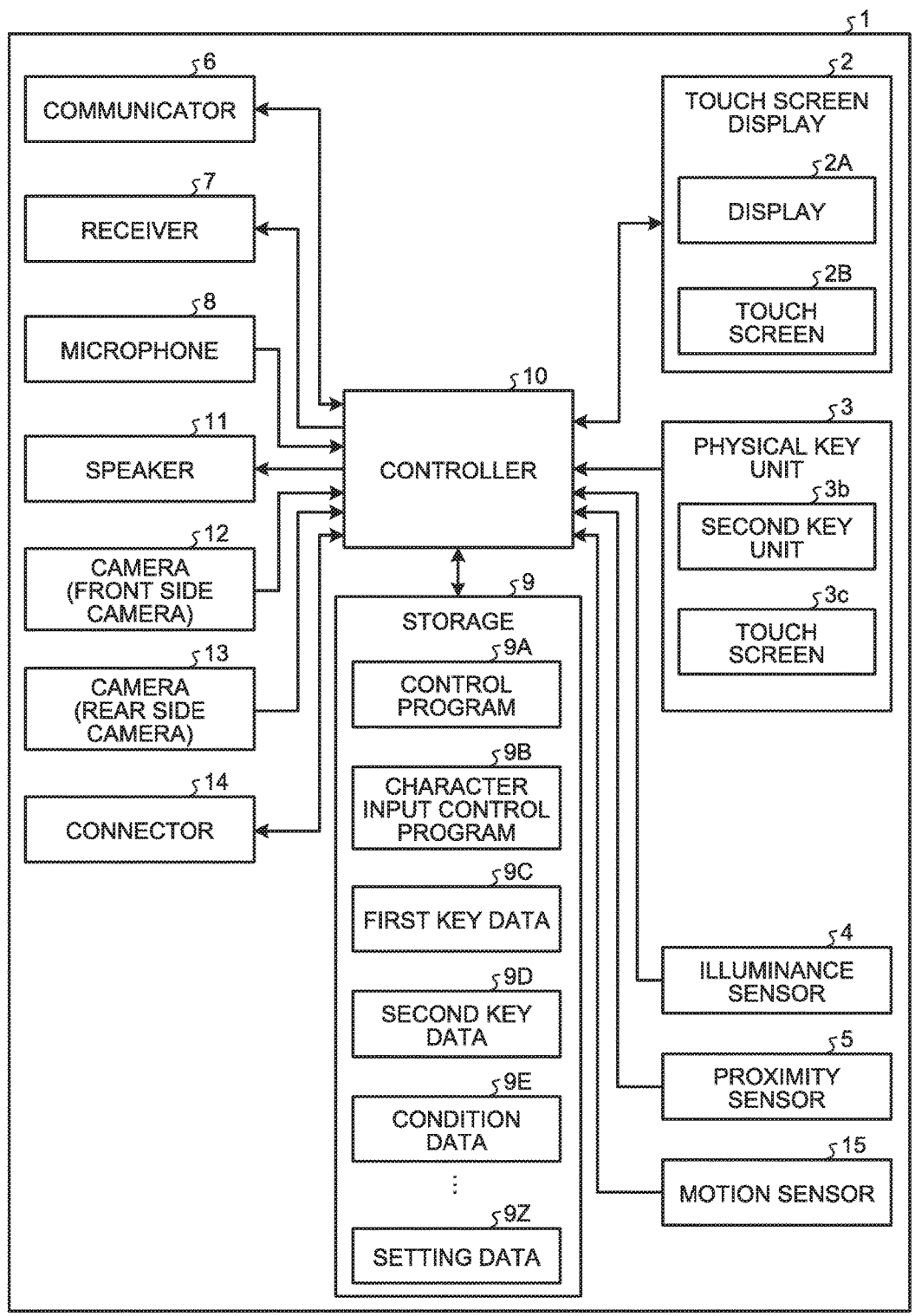
FIG. 12 is another block diagram illustrating an exemplary functional configuration of the electronic device according to the embodiments.
Figure 13:
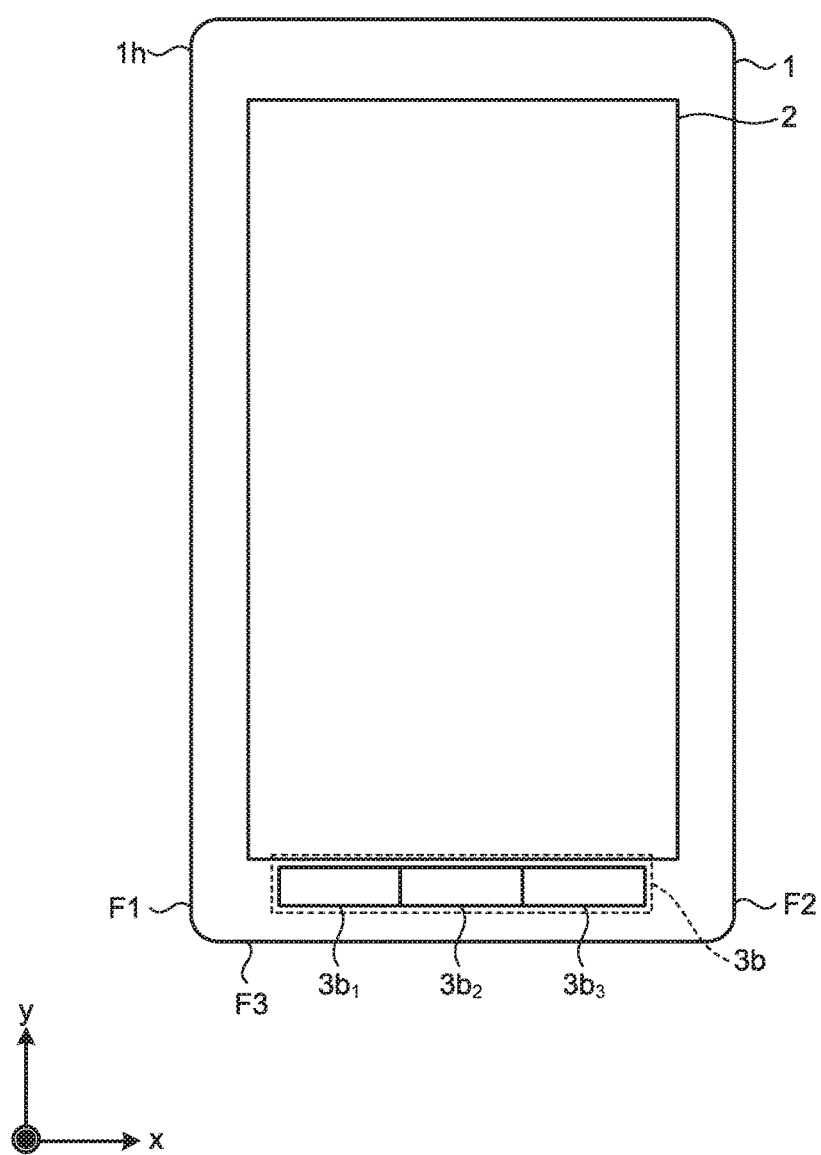
FIG. 13 is a diagram illustrating an exemplary arrangement of a key unit according to the embodiments.

Another exemplary character input process executed by the electronic device 1 will be described. FIG. 12 is a block diagram illustrating an exemplary functional configuration of the electronic device 1 according to the embodiments. FIG. 13 is a diagram illustrating an exemplary arrangement of a key unit according to the embodiments. The electronic device 1 illustrated in FIGS. 12 and 13 has the same configuration as that of the electronic device 1 illustrated in FIGS. 1 and 3 except that only the second key unit 3b is provided as the physical key unit 3. The second key unit 3b of the physical key unit 3 of the electronic device 1 illustrated in FIGS. 12 and 13 is arranged in the same position as that of the second key unit 3b of the electronic device 1 illustrated in FIGS. 1 and 3. The second key unit 3b includes three physical keys in total that are the physical key $3b_1$, the physical key $3b_2$ and the physical key $3b_3$ illustrated in FIG. 13. The physical keys $3b_1$, $3b_2$ and $3b_3$ are arranged in a row along an edge F3 on the bottom side of the housing 1h of the electronic device 1 in a direction parallel to the x-axis represented in FIG. 13. In the embodiment, no physical key is arranged along an edge F1 on the left side of the housing 1h of the electronic device 1 illustrated in FIG. 13; however, physical keys may be arranged along the edge F1. In the embodiment, no physical key is arranged along an edge F2 on the right side of the housing 1h of the electronic device 1 illustrated in FIG. 13; however, physical keys may be arranged along the edge F2. The embodiment illustrates the case where the electronic device 1 does not include the first key unit 3a; however, the electronic device 1 may include the first key unit 3a. The amount of physical keys constituting the second key unit 3b illustrated in FIG. 13 is an example only, and the second key unit 3b need not necessarily consist of the same number of physical keys as that in the example illustrated in FIG. 13. In the example illustrated in FIG. 13, the physical keys $3b_1$, $3b_2$ and $3b_3$ are arranged along the side F3 of the housing 1h. Alternatively, the physical keys $3b_1$, $3b_2$ and $3b_3$ may be arranged along another side of the housing 1h or may be arranged along one of the sides forming the outline of the touch screen display 2.

Figure 14:
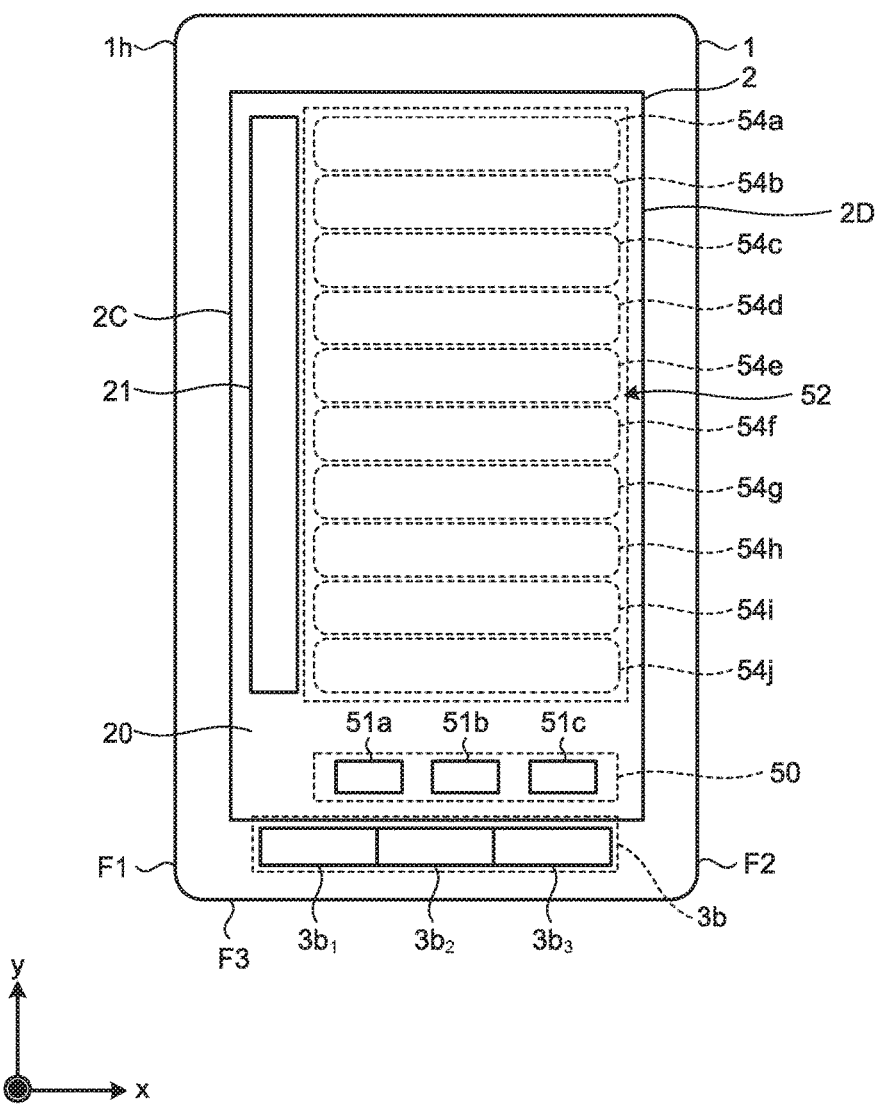
FIG. 14 is a diagram illustrating an exemplary key configuration according to the embodiments.

FIG. 14 is a diagram illustrating an exemplary key configuration according to the embodiments. The electronic device 1 displays the screen 20 illustrated in FIG. 14 on the display 2A when executing the character input process. The screen 20 includes a text display area 21, a first key area 50 and a second key area 52. In the text display area 21, it is possible to display, for example, characters or a character array input by performing the character input process. The text display area 21 is arranged along the side 2C of the touch screen display 2.

The first key area 50 and the second key area 52 are provided in a position in which the first key area 50 and the second key area 52 overlap the touch screen 2B. The first key area 50 is provided along a side where the second key unit 3b of the touch screen display 2 is arranged. The first key area 50 contains three software keys in total that are a first key 51a, a first key 51b and a first key 51c. The first keys 51a, 51b and 51c are arranged in a row along a side of the touch screen display 2 along the edge F3 on the bottom side of the housing 1h of the electronic device 1 in a direction parallel to the x-axis represented in FIG. 14. The first keys 51a, 51b and 51c of the embodiment contains information representing that a first row, a second row, and a third row in the first key data 9C are allocated thereto. In the following descriptions, the first keys 51a, 51b and 51c will be referred to as first keys 51 when they are not distinguished from one another.

The second key area 52 is provided along a side 2D of the touch screen display 2 and the text display area 21, and is adjacent to the side 2D. In the second key area 52, a plurality of second keys 54a, 54b, 54c, 54d, 54e, 54f, 54g, 54h, 54i and 54j are displayed. The second keys 54a, 54b, 54c, 54d, 54e, 54f, 54g, 54h, 54i and 54j according to the embodiment are arranged in a row along the side 2D from the top side of the screen 20 illustrated in FIG. 14 to the bottom side. That is, the second keys 54a, 54b, 54c, 54d, 54e, 54f, 54g, 54h, 54i and 54j are arranged along the side 2D in this order from a side away from the second key unit 3b to a side close to the second key unit 3b. The second keys 54a, 54b, 54c, 54d, 54e, 54f, 54g, 54h, 54i and 54j are areas obtained by dividing the second key area 52 from the top side of the screen 20 to the bottom side. In the following descriptions, the second keys 54a, 54b, 54c, 54d, 54e, 54f, 54g, 54h, 54i and 54j will be referred to as second keys 54 when they are not distinguished from one another.

It is possible to allocate characters of the elements 1 to 10 of one of the arrays/rows represented by the second key data 9D to the second keys 54a, 54b, 54c, 54d, 54e, 54f, 54g, 54h, 54i and 54j according to the embodiment. It is possible to display images representing the allocated characters on the second keys 54a, 54b, 54c, 54d, 54e, 54f, 54g, 54h, 54i and 54j. The second keys 54a, 54b, 54c, 54d, 54e, 54f, 54g, 54h, 54i and 54j function as software keys arranged on the touch screen display 2. For example, providing the second keys 54a, 54b, 54c, 54d, 54e, 54f, 54g, 54h, 54i and 54j along the side 2D enables the user to operate the second keys 54 along the key unit. The text display area 21 is provided to the screen 20 illustrated in FIG. 14; however, the text display area 21 need not be provided.

Figure 15:
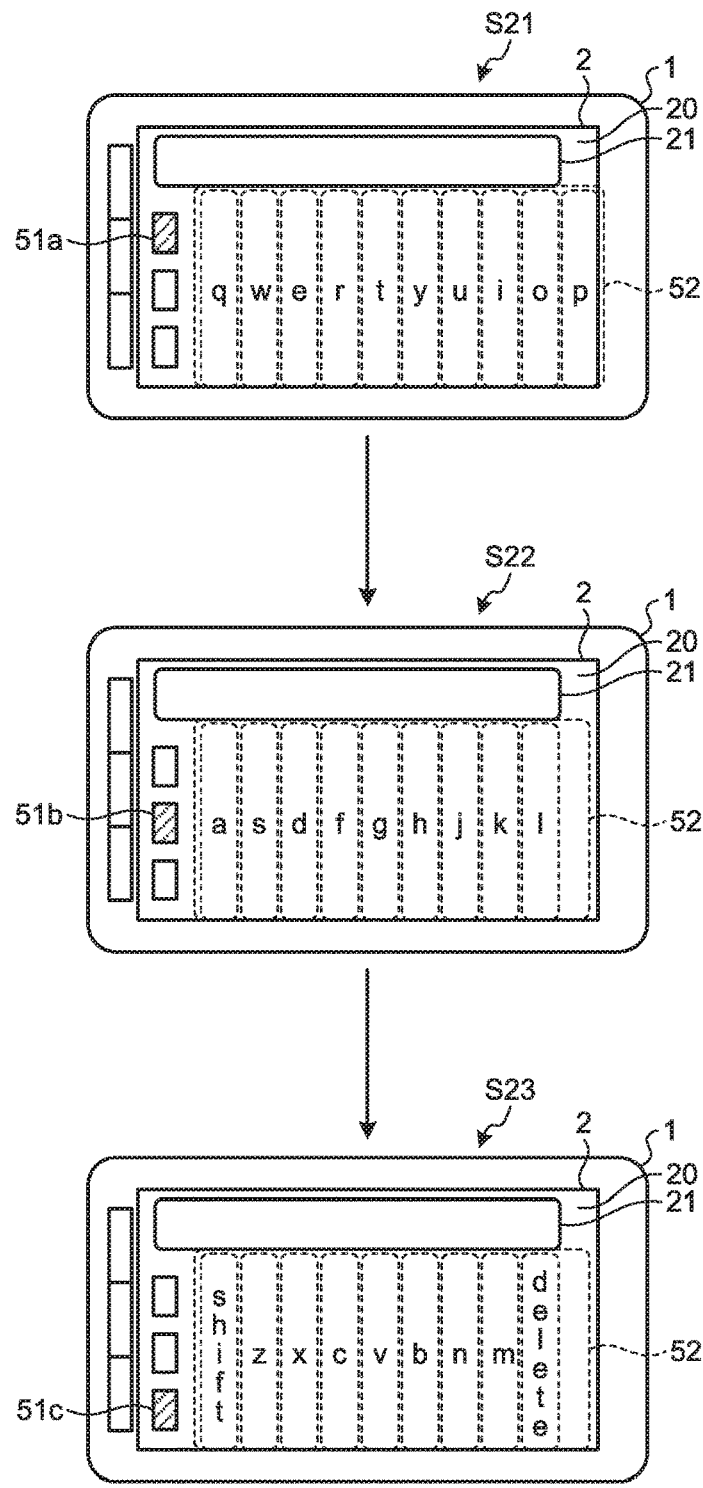
FIG. 15 is a diagram illustrating an exemplary character input process performed by the electronic device.

FIG. 15 is a diagram illustrating another exemplary character input process performed by the electronic device 1 according to the embodiments. The example illustrated in FIG. 15 represents an exemplary case where the user uses the electronic device 1 in a horizontal position.

As illustrated in FIG. 15, the electronic device 1 displays the screen 20 on the touch screen display 2 when executing the character input process. At Step S21 illustrated in FIG. 15, the user performs the provisionally choosing operation on the first key 51a in the first key area 50. When the provisionally choosing operation on the first key 51a is detected via the touch screen 2B at Step S21, the electronic device 1 determines that the first row in the first key data 9C allocated to the first key 51a is chosen according to the setting data 9Z. The electronic device 1 allocates the characters to the second keys 54 according to the array of the first row (q-row) in the second key data 9D. The electronic device 1 displays images representing the characters "q", "w", "e", "r", "t", "y", "u", "i", "o" and "p" on the second keys 54j, 54i, 54h, 54g, 54f, 54e, 54d, 54c, 54b and 54a on the screen 20. When the characters are allocated to the second keys 54, the electronic device 1 outputs voice representing the first row in the second key data 9D from the speaker 11. In the example illustrated at Step S21, the electronic device 1 outputs reading voice of "qwertyuiop" representing the first row.

At Step S22, the user performs the provisionally choosing operation on the first key 51b in the first key area 50. At Step S22, when the provisionally choosing operation on the first key 51b in the first key area 50 is detected via the touch screen 2B, the electronic device 1 determines that the second row (a-row) in the second key data 9D allocated to the first key 51b in the first key area 50 is chosen according to the setting data 9Z. The electronic device 1 allocates the characters to the second keys 54 according to the elements of the second row in the second key data 9D. The electronic device 1 displays images representing the characters "a", "s", "d", "f", "g", "h", "j", "k" and "l" on the second keys 54j, 54i, 54h, 54g, 54f, 54e, 54d, 54c and 54b, respectively. When the characters are allocated to the second keys 54, the electronic device 1 outputs voice representing the second row in the second key data D from the speaker 11. In the example illustrated at Step S22, the electronic device 1 outputs reading voice of "asdfghjkl" representing the second row.

At Step S23, the user performs the provisionally choosing operation on the first key 51c in the first key area 50. When the provisionally choosing operation on the first key 51c in the first key area 50 is detected via the touch screen 2B at Step S23, the electronic device 1 determines that the third row in the first key data 9C allocated to the first key 51c in the first key area 50 is chosen according to the setting data 9Z. The electronic device 1 allocates the characters and words to the second keys 54 according to the elements of the third row in the second key data 9D. The electronic device 1 displays images representing the characters and words "shift", "z", "x", "c", "v", "b", "n", "m" and "delete" on the second keys 54j, 54i, 54h, 54g, 54f, 54e, 54d, 54c and 54b on the screen 20. When the characters and words are allocated to the second keys 54, the electronic device 1 outputs voice representing the third row in the second key data 9D from the speaker 11. In the example illustrated at Step S23, the electronic device 1 outputs reading voice of "zxcvbnm" representing the third row.

In the above-described manner, when the operation on the first key 51a, first key 51b or 51c in the first key area 50 is detected, the electronic device 1 allocates one of the rows of the QWERTY layout allocated to the detected first key to the second keys 54. This enables the user to estimate the row of the QWERTY layout allocated to the second keys 54 and the key arrangement by operating the first keys 51a, 51b or 51c in the first key area 50. Providing only the keys of one of the rows to the second keys 54 makes it possible to inhibit the keys to be chosen from being changed depending on a position in the vertical direction on the screen. Accordingly, the electronic device 1 makes it possible to recognize the positions of the keys of the QWERTY layout easily and accordingly improve operability in inputting characters by using the keys of the QWERTY layout. Furthermore, the electronic device 1 is able to notify by sound the user of the row of the QWERTY layout allocated to the second keys 54. Thus the user is able to know which row is specified. In the electronic device 1, the first key area 50 is provided along the side of the touch screen display 2. In the electronic device 1, the second keys 54 in the first key area 50 may be provided along the edge of the housing 1h, the boundary between the housing 1h and the touch screen display 2, or the side of the touch screen display 2. Accordingly, by moving, for example, a finger along the edge of the housing 1h, the boundary between the housing 1h and the touch screen display 2, or the side of the touch screen display 2, the user is able to choose and operate the keys and performs an operation on the key simply.

The example illustrated in FIG. 15 illustrates the case where, when the amount of characters to be allocated is smaller than the amount of the second keys 54, the electronic device 1 allocates the characters closely from the second key 54j (the side where the second key unit 3b is arranged); however, the embodiments are not limited thereto. For example, when the amount of characters to be allocated is smaller than the amount of the second keys 54, the electronic device 1 may allocate the characters closely from the second key 54a. For example, when the amount of characters to be allocated is smaller than the amount of the second keys 54 by at least two, the electronic device 1 need not allocate characters to the second keys 54j and 54a.

The above-described embodiment illustrates the case where, when the user performs the provisionally choosing operation on one of the first keys 51 and then an operation on one of the second keys 54 is detected, the electronic device 1 accepts character input; however, the embodiments are not limited thereto. For example, when the determining operation on one of the first keys 51 is detected in the state where one of the rows of the QWERTY layout is chosen by performing the provisionally choosing operation on one of the first keys 51, the electronic device 1 may accept input of an allocated character of the chosen row of the QWERTY layout. For example, when the determining operation on one of the first keys 51 is detected in the state where the "q" row in the QWERTY layout is chosen, the electronic device 1 may accept input of the top character "q" in the row.

Figure 16:
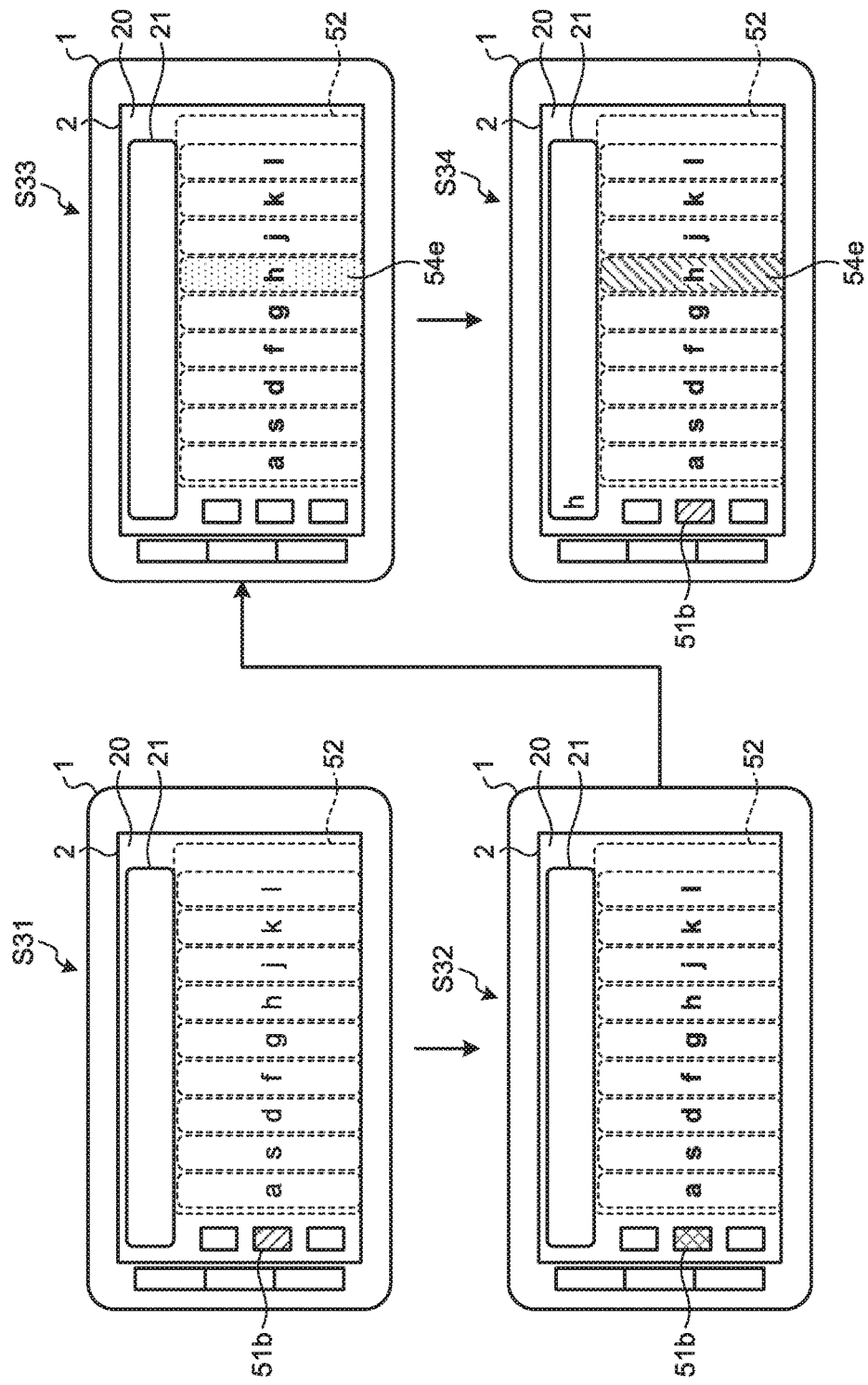
FIG. 16 is a diagram for explaining the exemplary character input process according to the embodiments.

FIG. 16 is a diagram for explaining another exemplary character input process according to the embodiments. With reference to FIG. 16, another type of exemplary control on the character input process performed by the electronic device 1 will be described. In the case illustrated in FIG. 16, the user inputs characters by using only the physical keys of the second key unit 3b and the second keys 54 that are software keys.

At Step S31 illustrated in FIG. 16, the user performs the provisionally choosing operation on the first key 51b in the first key area 50. At Step S31, when the provisionally choosing operation on the first key 51b in the first key area 50 is detected via the touch screen 2B, the electronic device 1 displays images representing the characters "a", "s", "d", "f", "g", "h", "j", "k" and "l" on the second keys 54j, 54i, 54h, 54g, 54f, 54e, 54d, 54c and 54b, respectively. The electronic device 1 outputs reading voice of "asdfghjkl" representing the second row in the QWERTY layout.

At Step S32, the user performs the determining operation on the first key 51b in the first key area 50. At Step S32, when the determining operation on the first key 51b in the first key area 50 is detected via the touch screen 2B, the electronic device 1 fixes the layout of the second keys 54 on the screen 20. In the example illustrated at Step S32, the electronic device 1 displays the characters allocated to the respective second keys 54j, 54i, 54h, 54g, 54f, 54e, 54d, 54c and 54b in an enhanced manner. The provisionally choosing operation may be, for example, tap, and the determining operation may be, for example, double tap or long tap.

At Step S33, the user performs the provisionally choosing operation on the second key 54e in the second key area 52. At Step S33, when the provisionally choosing operation on the second key 54e is detected via the touch screen 2B, the electronic device 1 executes output process corresponding to the second key 54e. Specifically, as the character "h" is allocated to the second key 54e, the electronic device 1 outputs, for example, reading voice of "h" from the speaker 11. In this case, the electronic device 1 turns the second key 54e into the provisionally chosen state.

At Step S34, the user performs the determining operation on the second key 54e. At Step S34, when the determining operation on the second key 54e is detected via the touch screen 2B, the electronic device 1 fixes the input of "h" allocated to the second key 54e and displays the character "h" in the text display area 21.

The above-described embodiment illustrates the case where the electronic device 1 distinguishes between the provisionally choosing operation and the determining operation on the first key 51b and the second key 54e; however, the embodiments are not limited thereto. For example, the electronic device 1 may detect operations on the first key 51 and the second key 54 without distinguishing between the provisionally choosing operation and the determining operation on the first key 51 and the second key 54. For example, the electronic device 1 may detect touch with the first key 51 or the second key 54 as any one of the provisionally choosing operation and the determining operation. That is, the electronic device 1 may detect the same operation as the provisionally choosing operation or the determining operation. The electronic device 1 may detect an operation on the first key 51 or the second key 54 as the determining operation without providing the provisionally choosing operation.

The example illustrated in FIG. 16 illustrates the case where the user performs the provisionally choosing operation on the first key 51b in the first key area 50 at Step S31 and then the user performs the determining operation on the first key 51b at Step S32; however, the embodiments are not limited thereto. For example, the electronic device 1 need not require the determining operation on the first key 51b at Step S32. Specifically, at Step S31, when an operation on the first key 51b in the first key area 50 is detected via the touch screen 2B, the electronic device 1 may allocate the characters of the array to the second keys 54 and fix the allocated characters on the screen 20. That is, in the example illustrated in FIG. 16, the electronic device 1 may omit the process at Step S32 and put forward the process from Step S31 to Step S33.

Figure 17:
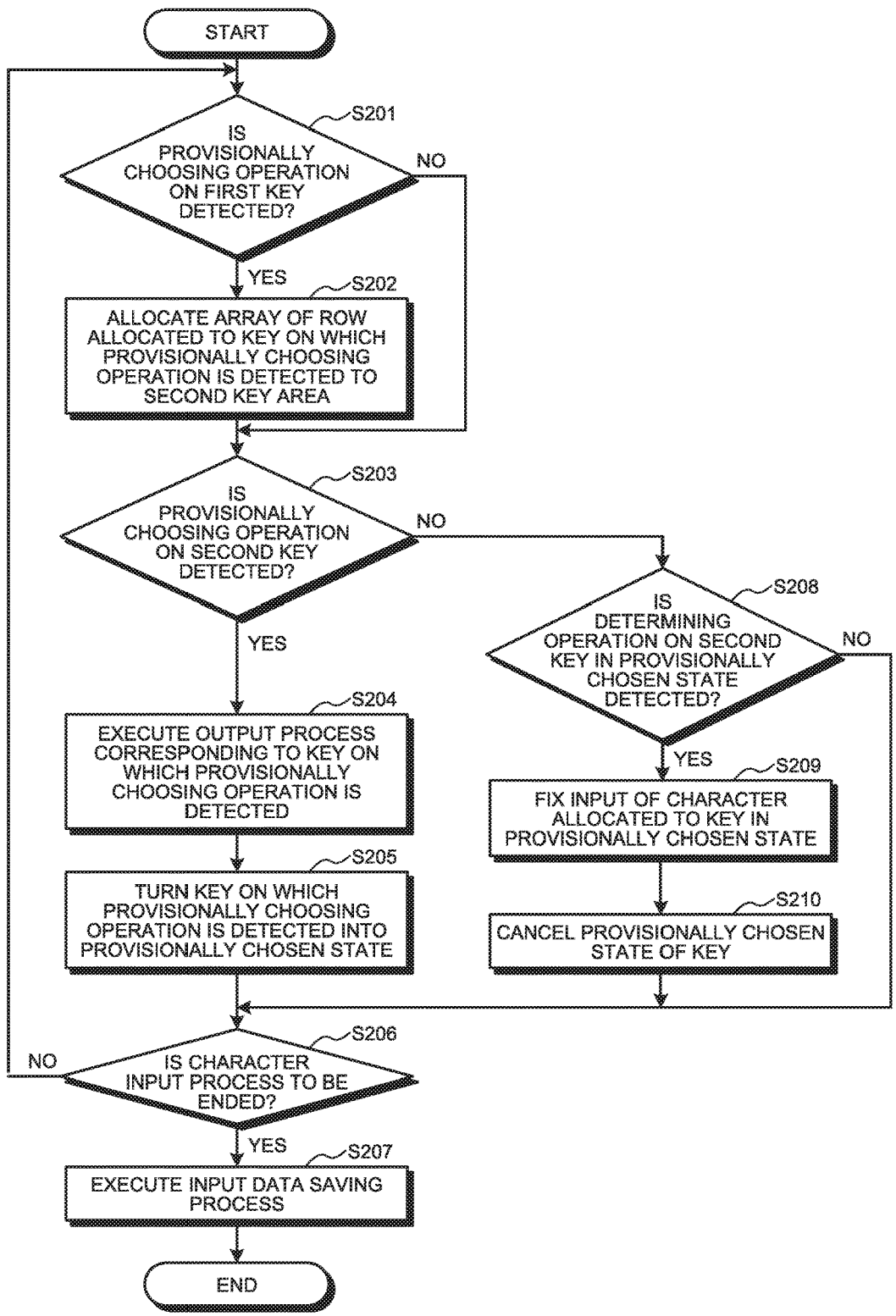
FIG. 17 is a flowchart illustrating an exemplary process procedure of control performed by the electronic device according to the embodiments.

FIG. 17 is a flowchart illustrating another exemplary process procedure of control performed by the electronic device 1 according to the embodiments. The process procedure illustrated in FIG. 17 is implemented by the controller 10 by executing the character input control program 9B. The process procedure illustrated in FIG. 17 is a process that is executed by the controller 10 in the state where the user requests character input. The process illustrated in FIG. 17 is a process where the determining operation on the first key is not detected.

As illustrated in FIG. 17, the controller 10 of the electronic device 1 determines whether the provisionally choosing operation on one of the first keys 51 is detected based on the result of detection by the touch screen 2B (Step S201). When the provisionally choosing operation on one of the first keys 51 is not detected (NO at Step S201), the controller 10 proceeds to Step S203, which will be described later. When it is determined that the provisionally choosing operation on one of the first keys 51 is detected (YES at Step S201), the controller 10 proceeds to Step S202.

The controller 10 allocates the array of the row allocated to the key on which the provisionally choosing operation is detected to the second key area 52 (Step S202). For example, the controller 10 specifies the row in the first key data 9C allocated to the first key 51 according to the setting data 9Z. The controller 10 specifies the amount of the second keys 54 according to the array of the specified row in the first key data 9C and allocates the characters to the second keys 54. The controller 10 displays the allocated characters on the second keys 54 and then proceeds to Step S203.

The controller 10 determines whether the provisionally choosing operation on the second key 54 is detected based on the result of the detection by the touch screen 2B (Step S203). For example, when an operation such as touch or tap on the second key 54 is detected, the controller 10 determines that the provisionally choosing operation on one of the second keys 54 is detected. When it is determined that the provisionally choosing operation on one of the second keys 54 is detected (YES at Step S203), the controller 10 proceeds to Step S204.

The controller 10 executes the output process corresponding to the key on which the provisionally choosing operation is detected (Step S204). For example, the output process includes a process performed by the controller 10 to output reading voice of the character allocated to the second key 54 on which the provisionally choosing operation is detected from the speaker 11. For example, the output process includes a process performed by the controller 10 to change a display mode of the key on which the provisionally choosing operation is detected. When the output process ends, the controller 10 turns the key on which the provisionally choosing operation is detected into the provisionally chosen state (Step S205). The key on which the provisionally choosing operation is detected is one of the second keys 54 on which the provisionally choosing operation is detected.

The controller 10 determines whether to end the character input process (Step S206). For example, when an ending operation of the character input process or an end timing is detected, the controller 10 determines to end the character input process. When the controller 10 determines not to end the character input process (NO at Step S206), the controller 10 returns to Step S201 which is already described. When the controller 10 determines to end the character input process (YES at Step S206), the controller 10 proceeds to Step S207.

The controller 10 executes the input data saving process (Step S207). For example, the input data saving process includes a process performed by the controller 10 to store input data in the storage 9 when the user wants to save the input data. For example, the input data saving process includes a process performed by the controller 10 to delete the input data when the user does not want to save the input data. For example, the input data saving process includes a process performed by the controller 10 to clear the screen displayed on the display 2A. When execution of the input data saving process ends, the controller 10 ends the process procedure illustrated in FIG. 17.

When it is determined that the provisionally choosing operation on one of the second keys 54 is not detected (NO at Step S203), the controller 10 proceeds to Step S208. The controller 10 determines whether the determining operation on the one of the second keys 54 in the provisionally chosen state is detected based on the result of the detection by the touch screen 2B (Step S208). For example, the determining operation is an operation such as long touch on the one of the second keys 54 in the provisionally chosen state. When an operation such as press or long touch on the second key unit 3b is detected, the electronic device 1 may determine that the determining operation on the one of the second keys 54 in the provisionally chosen state is detected. When it is determined that the determining operation on the one of the second keys 54 in the provisionally chosen state is not detected (NO at Step S208), the controller 10 proceeds to Step S206 which is already described. When it is determined that the determining operation on the one of the second keys 54 in the provisionally chosen state is detected (YES at Step S208), the controller 10 proceeds to Step S209.

The controller 10 fixes the input of the character corresponding to the key in the provisionally chosen state (Step S209). For example, the controller 10 is able to temporarily store the fixed character as input data in the storage 9. The controller 10 cancels the provisionally chosen state of the key (Step S210). When the provisionally chosen state of the key is canceled, the controller 10 proceeds to Step S206.

According to the embodiments, the rows in the first key data 9C are allocated to the first keys 51 displayed in the first key area 50 respectively. Alternatively, the rows in the first key data 9C may be allocated to the keys in the second key unit. In this case, a row of the keyboard is specified by operating a physical key and a key of the specified row is specified by operating a software key.

The embodiments disclosed herein may be modified without departing from the scope of the invention. Furthermore, the embodiments disclosed herein and modifications thereof may be combined as appropriate. For example, the above-described embodiments may be modified as described below.

Each of the programs illustrated in FIG. 1 may be divided into multiple modules or may be combined with another program.

The above-described embodiments illustrate the electronic device 1 as an exemplary electronic device including the touch screen 2B; however, the electronic device according to the application is not limited thereto. The electronic device according to the application may be a portable electronic device other than the electronic device. Examples of the portable electronic device include, but are not limited to, a mobile phone, a tablet, a portable personal computer, a digital camera, a smart watch, a media player, an electronic book reader, a navigator, a game machine, etc.

Figure 18:
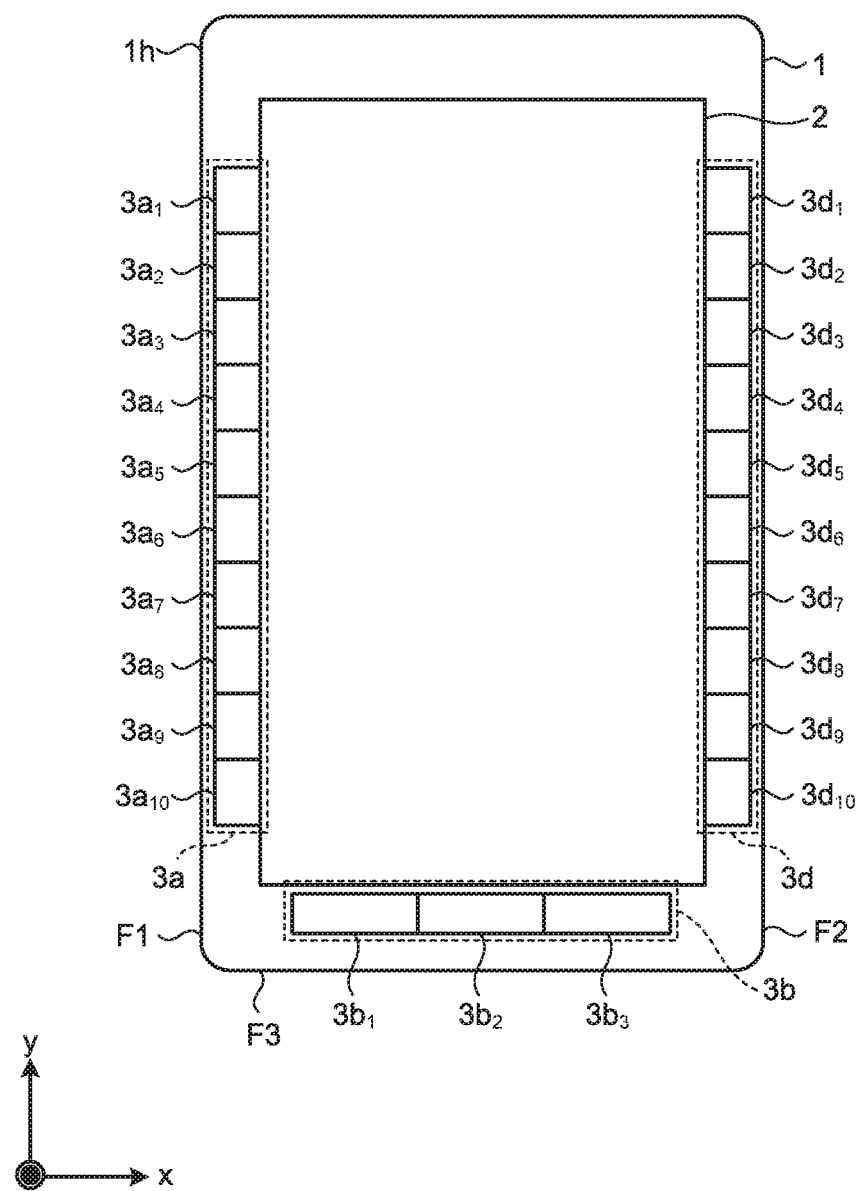
FIG. 18 is a diagram illustrating an exemplary arrangement of key units according to the embodiments.

With reference to FIGS. 18 to 29, various examples of the electronic device 1 will be described. FIG. 18 is a diagram illustrating an exemplary arrangement of key units according to the embodiments. The electronic device 1 illustrated in FIG. 18 includes a third key unit $3d$ in the housing $1h$ substantially forming a cuboid in addition to the first key unit $3a$ and the second key unit $3b$. The first key unit $3a$ includes ten physical keys $3a_1$ to $3a_{10}$ in total. The physical keys $3a_1$ to $3a_{10}$ of the first key unit $3a$ are arranged along the edge F1 on the left side of the housing $1h$ of the electronic device 1 in a row in a direction parallel to the y-axis illustrated in FIG. 18. The second key unit $3b$ includes three physical keys in total that are the physical key $3b_1$, the physical key $3b_2$ and the physical key $3b_3$ illustrated in FIG. 18. The physical keys $3b_1$, $3b_2$ and $3b_3$ are arranged along the edge F3 on the bottom side of the housing $1h$ of the electronic device 1 in a row in a direction parallel to the x-axis illustrated in FIG. 18. The third key unit $3d$ includes ten physical keys in total that are physical keys $3d_1$ to $3d_{10}$. The physical keys $3d_1$ to $3d_{10}$ are arranged along the edge F2 on the right side of the housing $1h$ of the electronic device 1 in a row in a direction parallel to the y-axis illustrated in FIG. 18. As described above, in the electronic device 1, the key units each including the physical keys may be arranged on the two sides of the housing $1h$ opposed to each other. In this case, one of the key units of the two rows is used for the above-described control. The amount of physical keys constituting each of the first key unit $3a$, the second key unit $3b$ and the third key unit $3d$ illustrated in FIG. 18 is an example only, and each of the first key unit $3a$, the second key unit $3b$ and the third key unit $3d$ needs not necessarily consist of the same number of physical keys as that in the example illustrated in FIG. 18. In the example illustrated in FIG. 18, the physical keys $3a_1$ to $3a_{10}$ are arranged along the edge F1 on the left side of the housing $1h$ of the electronic device 1. Alternatively, the physical keys $3a_1$ to $3a_{10}$ may be arranged along a side forming the outline of the touch screen display 2. Similarly, the physical keys $3b_1$ to $3b_3$ may be arranged along a side forming the outline of the touch screen display 2. The physical keys $3d_1$ to $3d_{10}$ are also arranged along the edge F2 on the right side of the housing $1h$ of the electronic device 1. Alternatively, the physical keys $3d_1$ to $3d_{10}$ may be arranged along a side forming the outline of the touch screen display 2. That is, each of the first key unit $3a$, the second key unit $3b$ and the third key unit $3d$ may be arranged along an outer side of the housing $1h$, along a side on the touch screen display 2 of the housing $1h$, or along the boundary between the housing $1h$ and the touch screen display 2.

Figure 19:
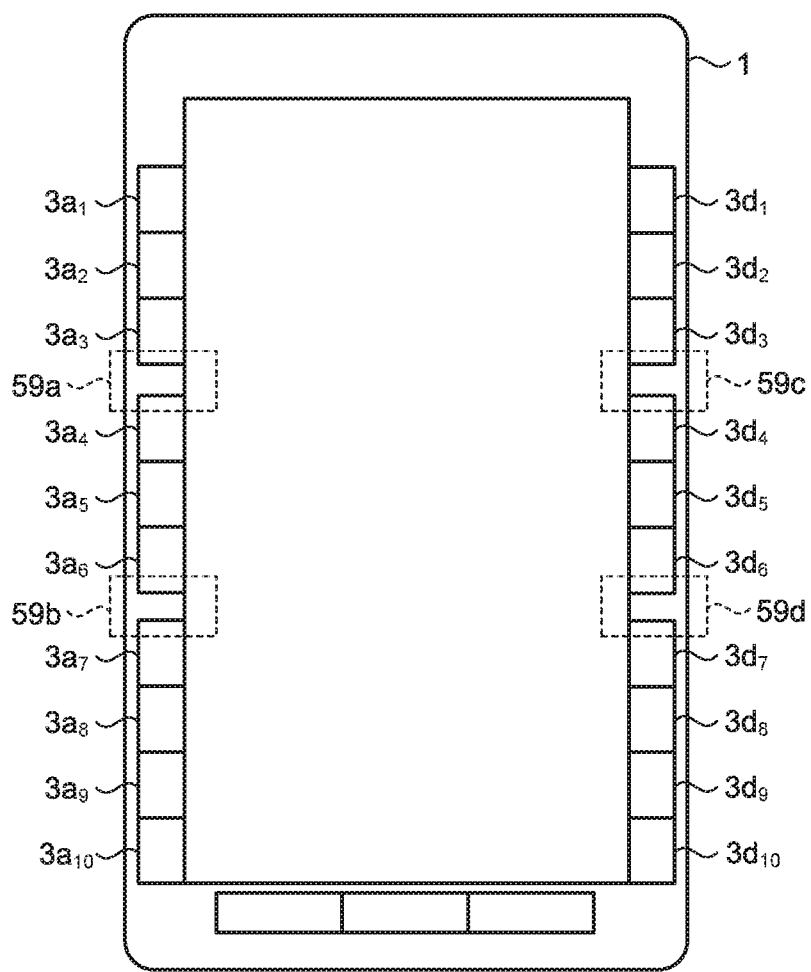
FIG. 19 is a diagram illustrating another exemplary arrangement of a plurality of physical keys included in the electronic device.
Figure 20:
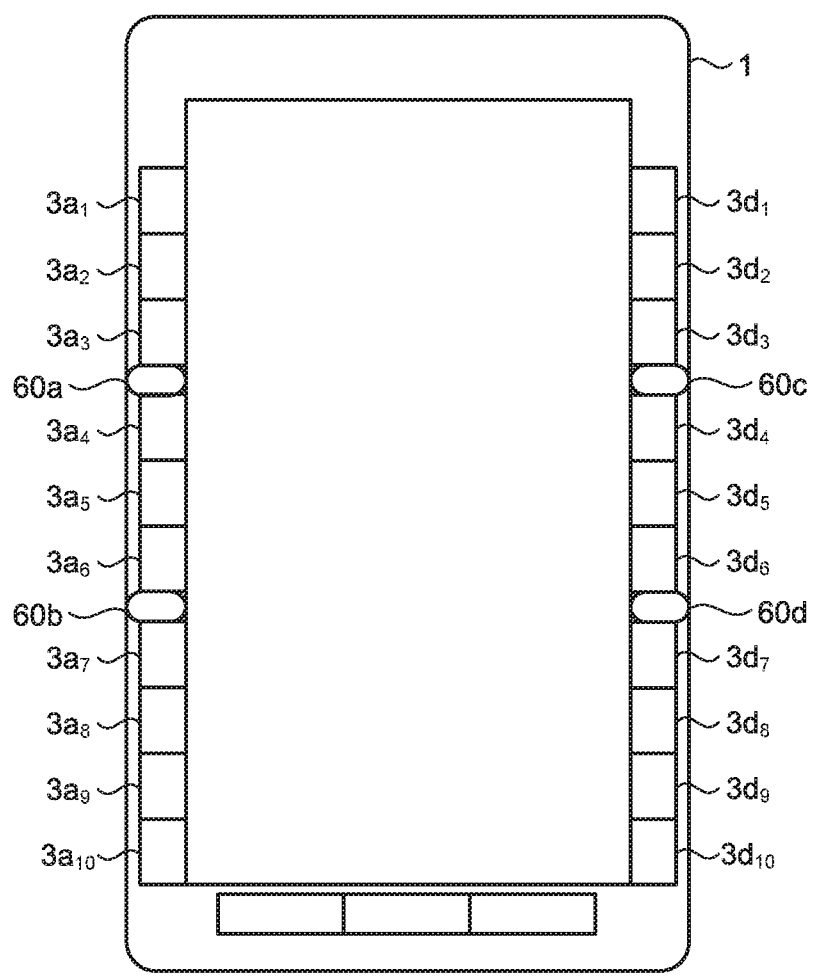
FIG. 20 is a diagram illustrating another exemplary arrangement of a plurality of physical keys included the electronic device.

FIGS. 19 and 20 are diagrams illustrating other exemplary arrangements of the physical keys included in the electronic device. In the electronic device 1, the physical keys may be divided into some groups and arranged. In the example illustrated in FIG. 19, a space $59a$ is provided between the physical key $3a_3$ and the physical key $3a_4$, and a space $59b$ is provided between the physical key $3a_6$ and the physical key $3a_7$ in the electronic device 1. Furthermore, in the electronic device 1, a space $59c$ is provided between the physical key $3d_3$ and the physical key $3d_4$, and a space $59d$ is provided between the physical key $3d_6$ and the physical key $3d_7$. Accordingly, in the electronic device 1, the physical keys $3a_1$ to $3a_{10}$ of the first key unit $3a$ are arranged in such a manner that the physical keys $3a_1$ to $3a_{10}$ are divided into a group consisting of the physical keys $3a_1$ to $3a_3$, a group consisting of the physical keys $3a_4$ to $3a_6$, and a group consisting of the physical keys $3a_7$ to $3a_{10}$. Similarly, the physical keys $3d_1$ to $3d_{10}$ of the third key unit $3d$ are arranged in such a manner that the physical keys $3d_1$ to $3d_{10}$ are divided into a group consisting of the physical keys $3d_1$ to $3d_3$, a group consisting of the physical keys $3d_4$ to $3d_6$, and a group consisting of the physical keys $3d_7$ to $3d_{10}$.

In the example illustrated in FIG. 20, a partition $60a$ is provided between the physical key $3a_3$ and the physical key $3a_4$ and a partition $60b$ is provided between the physical key $3a_6$ and the physical key $3a_7$ in the electronic device 1. Furthermore, a partition $60c$ is provided between the physical key $3d_3$ and the physical key $3d_4$ and a partition $60d$ is provided between the physical key $3d_6$ and the physical key $3d_7$ in the electronic device 1. Accordingly, in the electronic device 1, the physical keys $3a_1$ to $3a_{10}$ of the first key unit $3a$ are arranged in such a manner that the physical keys $3a_1$ to $3a_{10}$ are divided into a group consisting of the physical keys $3a_1$ to $3a_3$, a group consisting of the physical keys $3a_4$ to $3a_6$, and a group consisting of the physical keys $3a_7$ to $3a_{10}$. Similarly, the physical keys $3d_1$ to $3d_{10}$ of the third key unit $3d$ are arranged in such a manner that the physical keys $3d_1$ to $3d_{10}$ are divided into a group consisting of the physical keys $3d_1$ to $3d_3$, a group consisting of the physical keys $3d_4$ to $3d_6$, and a group consisting of the physical keys $3d_7$ to $3d_{10}$.

Figure 21:
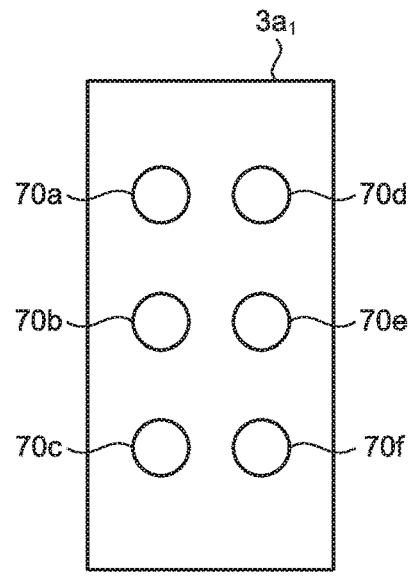
FIG. 21 is a diagram illustrating another exemplary structure relating to an operation surface of a physical key included in the electronic device according to the embodiments.
Figure 22:
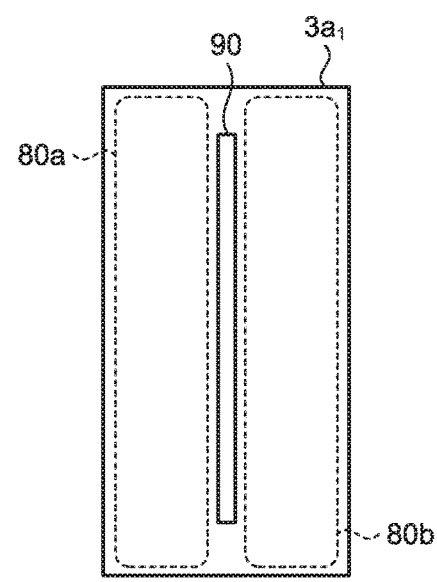
FIG. 22 is a diagram illustrating another exemplary structure relating to an operation surface of a physical key included the electronic device according to the embodiments.

FIGS. 21 and 22 are diagrams illustrating another exemplary structure relating to an operation surface of the physical key included in the electronic device 1 according to the embodiments. The operation surface of the physical key $3a_1$ among the physical keys of the electronic device 1 will be exemplified. In the example illustrated in FIG. 21, for example, six protrusions $70a$ to $70f$ for presenting a braille pattern are formed on the operation surface of the physical key $3a_1$ (the surface contacted by a user for operation) in the electronic device 1. The protrusions $70a$ to $70f$ are provided in such a manner that they can protrude from the surface of the physical key $3a_1$ by an actuator and the like, and also can be stored inside the physical key $3a_1$. The six protrusions $70a$ to $70f$ protrude according to a character to be output. The physical key $3a_1$ may be provided in a state of being rotated by 90 degrees from the example illustrated in FIG. 21 in accordance with a general horizontal motion of a finger to read braille.

For example, in the electronic device 1, when the characters of one row of the QWERTY layout are allocated to a plurality of physical keys each of which has protrusions, the protrusions of each of the physical key may be made according to a protrusion pattern corresponding to the character allocated thereto. For example, when "p" of the QWERTY layout is allocated to the physical key $3a_1$, the electronic device 1 may perform control such that the protrusions $70a$, $70b$, $70c$ and $70d$ of the physical key $3a_1$ protrude and the protrusions $70e$ and $70f$ do not protrude in accordance with the character "p". As a result, the user touches the operation surface of the physical key $3a_1$ with his/her finger and thus recognize that the protrusions $70a$, $70b$, $70c$ and $70d$ protrude, thereby recognizing that the character "p" is allocated to the physical key $3a_1$. When the characters of another row of the QWERTY layout are allocated to the physical keys, the protrusions of each of the physical keys may be made according to a protrusion pattern corresponding to a newly character allocated thereto in the electronic device 1.

In the example illustrated in FIG. 22, a linear partition 90 parallel to a longitudinal direction of the physical key $3a_1$ may be provided to the operation surface of the physical key $3a_1$ such that the operation surface of the physical key $3a_1$ is divided into two areas $80a$ and $80b$. The electronic device 1 is able to change the process according to on which of the two areas $80a$ and $80b$ on the operation surface of the physical key $3a_1$ touch is detected.

Figure 23:
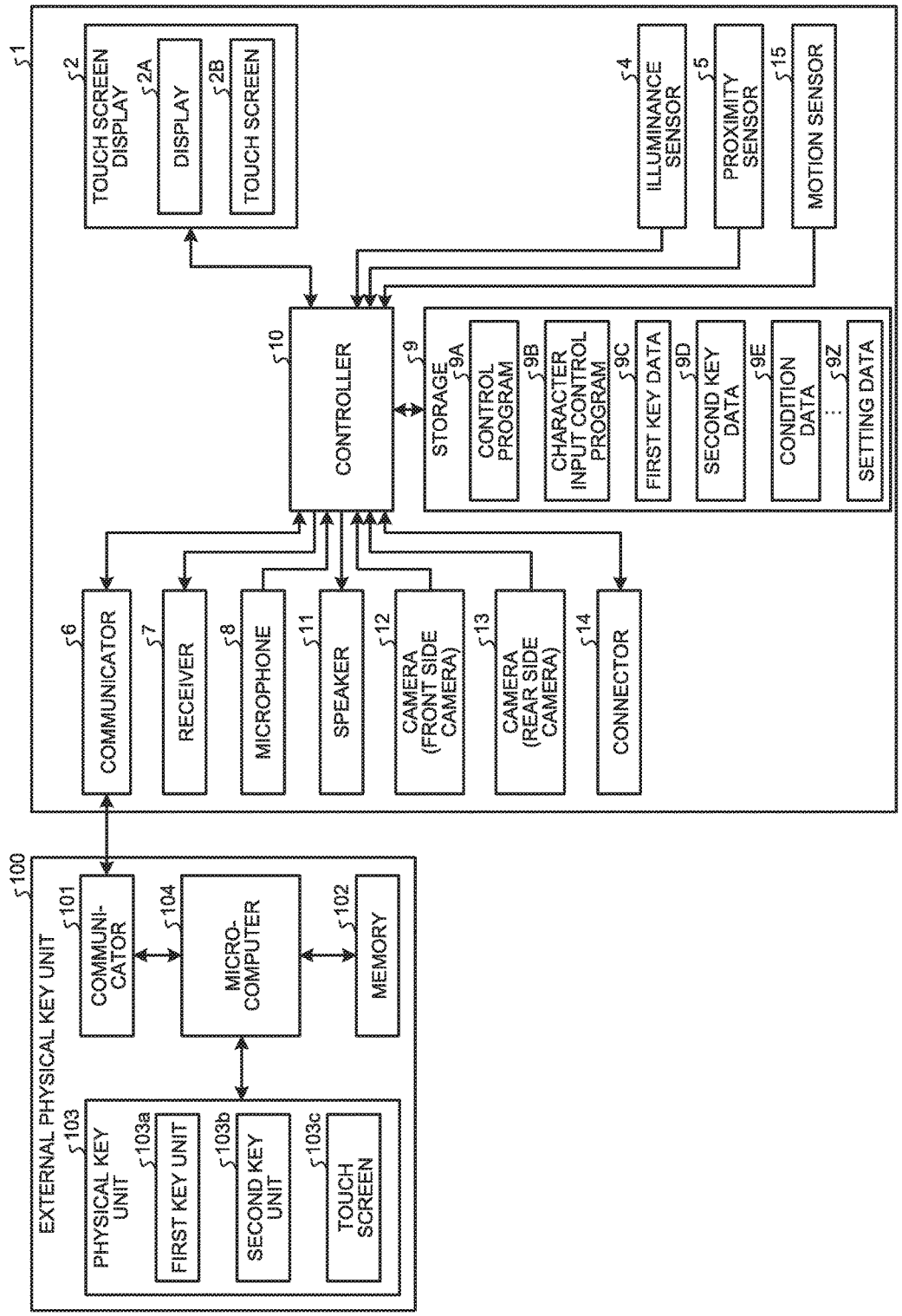
FIG. 23 is a diagram illustrating another exemplary functional configuration of the electronic device according to the embodiments.

With reference to FIG. 23, another exemplary functional configuration of the electronic device 1 will be described. FIG. 23 is a diagram illustrating the exemplary functional configuration of the electronic device according to the embodiments. The above-described embodiments illustrate the exemplary electronic device 1 including the physical key unit 3 inside (refer to FIG. 1). Alternatively, the physical key unit 3 may be configured as a detachable individual unit. As illustrated in FIG. 23, the electronic device 1 is communicably connected to an external physical key unit 100 via the communicator 6. The external physical key unit 100 includes a communicator 101, a memory 102, a physical key unit 103 and a microcomputer 104. The physical key unit 103 includes a first key unit $103a$, a second key unit $103b$ and a touch screen $103c$. The electronic device 1 receives information on operations of the user on the external physical key unit 100 via the communicator 6 to execute the same process as that of the embodiment described above.

Figure 24:
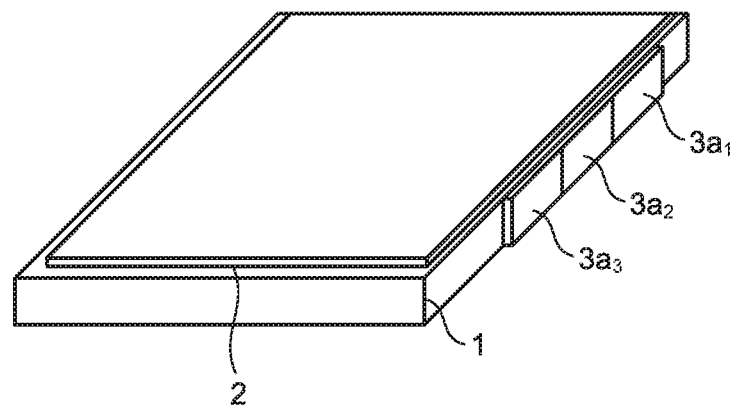
FIG. 24 is a diagram illustrating another exemplary structure of the electronic device according to the embodiments.
Figure 25:
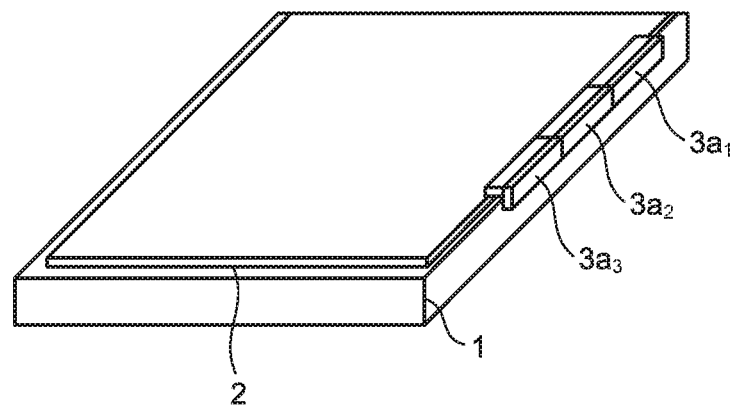
FIG. 25 is a diagram illustrating another exemplary structure of the electronic device according to the embodiments.

FIGS. 24 to 29 are diagrams illustrating other exemplary structures of the electronic device according to the embodiments. As illustrated in FIGS. 24 and 25, the electronic device 1 may be a structure in which the physical keys $3a_1$ to $3a_3$ are arranged on a side surface of the housing $1h$.

Figure 26:
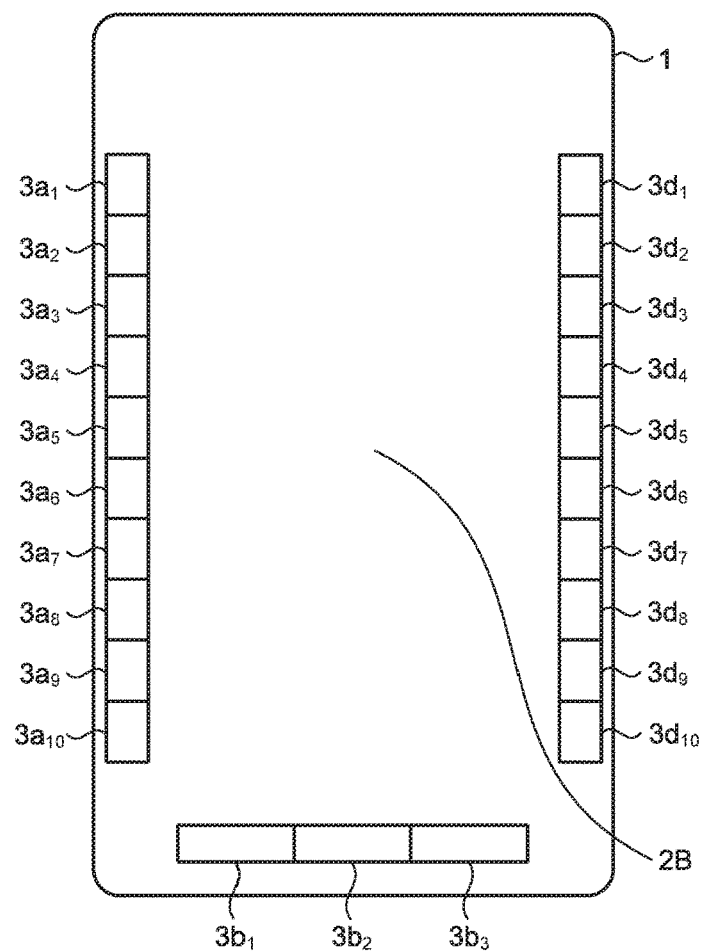
FIG. 26 is a diagram illustrating another exemplary structure of the electronic device according to the embodiments.
Figure 27:
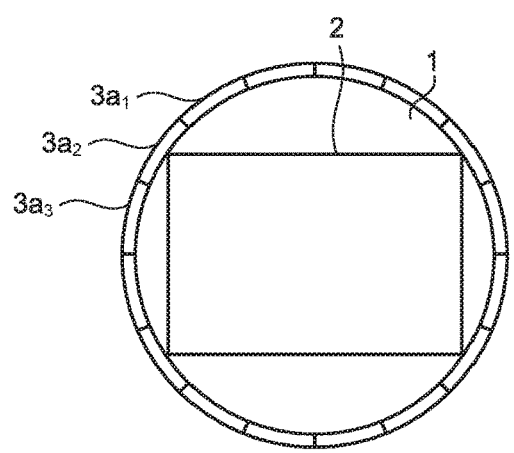
FIG. 27 is a diagram illustrating another exemplary structure of the electronic device according to the embodiments.
Figure 28:
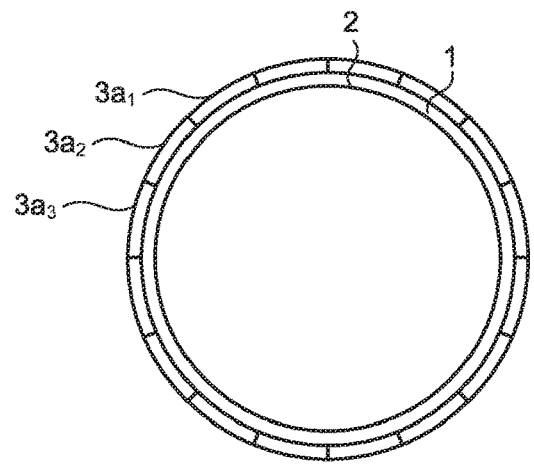
FIG. 28 is a diagram illustrating another exemplary structure of the electronic device according to the embodiments.
Figure 29:
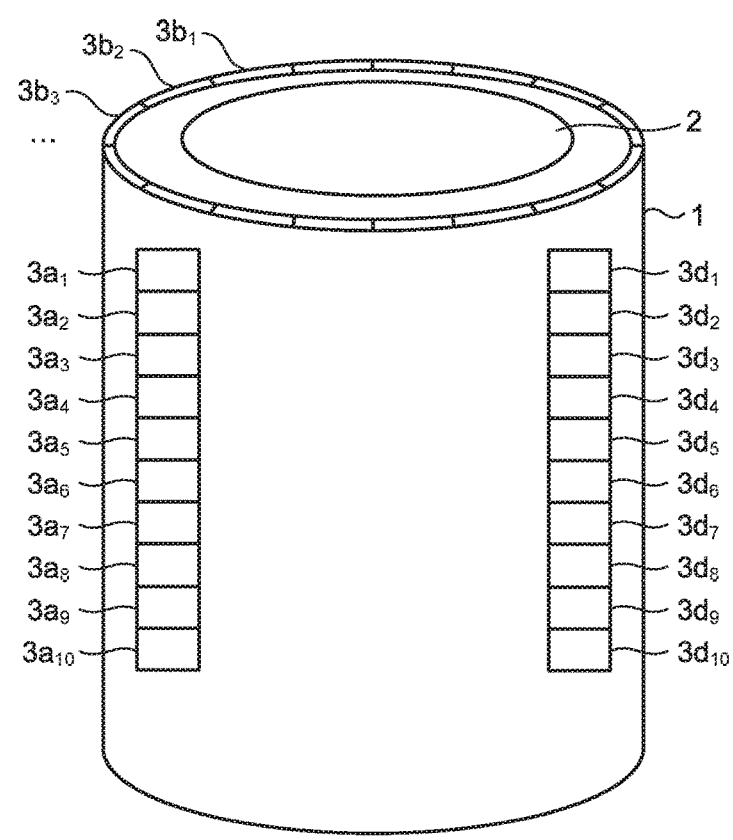
FIG. 29 is a diagram illustrating another exemplary structure of the electronic device according to the embodiments.

Furthermore, as illustrated in FIG. 26, the electronic device 1 may be a structure in which only the touch screen 2B and the physical keys are arranged on the operation surface to the user. That is, the electronic device 1 need not include a display. As illustrated in FIGS. 27 and 28, the electronic device 1 may be a substantially circular structure in which the touch screen display 2 is arranged inside and the physical keys are arranged on an outer circumference of the structure. As illustrated in FIG. 29, the electronic device 1 may be a column-shaped structure in which the touch screen display 2 is arranged on a top surface and the physical keys are arranged on a side surface.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic device comprising:
a housing;
a touch screen that is arranged on the housing;
a plurality of first software keys that are arranged in a first row along a first edge of the touch screen;
a plurality of second software keys that are arranged in a second row along a second edge of the touch screen;
a plurality of physical keys that are arranged in a third row along the first edge; and
at least one controller configured to execute a process according to an operation on any one of the first software keys, the second software keys and the physical keys,
wherein
the at least one controller is further configured to
allocate characters that are "Q", "W", "E", "R", "T", "Y", "U", "I", "O" and "P" to the physical keys respectively,
allocate characters that are "A", "S", "D", "F", "G", "H", "J", "K" and "L" to the first software keys respectively, and
allocate characters that are "Z", "X", "C", "V", "B", "N" and "M" to the second software keys respectively,
or
the at least one controller is further configured to
allocate characters that are "Q", "W", "E", "R", "T", "Y", "U", "I", "O" and "P" to the second software keys respectively,
allocate characters that are "A", "S", "D", "F", "G", "H", "J", "K" and "L" to the first software keys respectively, and
allocate characters that are "Z", "X", "C", "V", "B", "N" and "M" to the physical keys respectively, and
wherein the plurality of physical keys, the plurality of first software keys, and the plurality of second software keys form a keyboard with a QWERTY layout.

2. An electronic device comprising:
a housing;
a touch screen;
a plurality of first software keys that are arranged along a first edge of the touch screen in a first direction of the touch screen;
a plurality of second software keys that are arranged along a second edge of the touch screen in a second direction of the touch screen, the second direction being perpendicular to the first direction; and
at least one controller configured to execute a process according to an operation on any one of the first software keys and the second software keys,
wherein
the at least one controller is further configured
to allocate a row including "Q", "W", "E", "R", "T", "Y", "U", "I", "O" and "P" to one of the first software keys, allocate a row including "A", "S", "D", "F", "G", "H", "J", "K" and "L" to another one of the first software keys, and allocate a row including "Z", "X", "C", "V", "B", "N" and "M" to a further one of the first software keys,
to allocate characters that are "Q", "W", "E", "R", "T", "Y", "U", "I", "O" and "P" to the second software keys respectively, when an operation on said one of the first software keys to which the row including "Q", "W", "E", "R", "T", "Y", "U", "I", "O" and "P" is allocated is detected,
to allocate characters that are "A", "S", "D", "F", "G", "H", "J", "K" and "L" to the second software keys respectively, when an operation on said another one of the first software keys to which the row including "A", "S", "D", "F", "G", "H", "J", "K" and "L" is allocated is detected, and
to allocate characters that are "Z", "X", "C", "V", "B", "N" and "M" to the second software keys respectively, when an operation on said further one of the first software keys to which the row including "Z", "X", "C", "V", "B", "N" and "M" is allocated is detected.

3. A control method performed by an electronic device including a housing, a touch screen arranged on the housing, a plurality of first software keys, a plurality of second software keys that are arranged along a second edge of the touch screen, and a plurality of physical keys, the control method comprising:
arranging the plurality of first software keys in a first row along a first edge of the touch screen;
arranging the plurality of second software keys in a second row along a second edge of the touch screen; and
arranging the plurality of physical keys in a third row along the first edge,
wherein the control method further comprises
either
allocating characters that are "Q", "W", "E", "R", "T", "Y", "U", "I", "O" and "P" to the physical keys respectively,
allocating characters that are "A", "S", "D", "F", "G", "H", "J", "K" and "L" to the first software keys, respectively and
allocating characters that are "Z", "X", "C", "V", "B", "N" and "M" to the second software keys respectively,
or
allocating characters that are "Q", "W", "E", "R", "T", "Y", "U", "I", "O" and "P" to the second software keys respectively,
allocating characters that are "A", "S", "D", "F", "G", "H", "J", "K" and "L" to the first software keys respectively, and
allocating characters that are "Z", "X", "C", "V", "B", "N" and "M" to the physical keys respectively, and
wherein the plurality of physical keys, the plurality of first software keys, and the plurality of second software keys form a keyboard with a QWERTY layout.

4. A control method performed by an electronic device including a housing, a touch screen, a plurality of first software keys, and a plurality of second software keys, the control method comprising:
arranging the plurality of first software keys along a first edge of the touch screen in a first direction of the touch screen; and
arranging the plurality of second software keys in a second row along a second edge of the touch screen in a second direction of the touch screen, the second direction being perpendicular to the first direction;
wherein the control method further comprises allocating a row including "Q", "W", "E", "R", "T", "Y", "U", "I", "O" and "P" to one of the first software keys, allocating a row including "A", "S", "D", "F", "G", "H", "J", "K" and "L" to another one of the first software keys, and allocating a row including "Z", "X", "C", "V", "B", "N" and "M" to a further one of the first software keys, allocating characters that are "Q", "W", "E", "R", "T", "Y", "U", "I", "O" and "P" to the second software keys respectively, when an operation on said one of the first software keys to which the row including "Q", "W", "E", "R", "T", "Y", "U", "I", "O" and "P" is allocated is detected, allocating characters that are "A", "S", "D", "F", "G", "H", "J", "K" and "L" to the second software keys respectively, when an operation on said another one of the first software keys to which the row including "A", "S", "D", "F", "G", "H", "J", "K" and "L" is allocated is detected, and allocating characters that are "Z", "X", "C", "V", "B", "N" and "M" to the second software keys respectively, when an operation on said further one of the first software keys to which the row including "Z", "X", "C", "V", "B", "N" and "M" is allocated is detected.

5. The electronic device according to claim 2, wherein the at least one controller is configured to in response to a provisionally choosing operation performed on any one of the plurality of first software keys, allocate respectively the characters included in the row allocated to the provisionally chosen first software key to the second software keys corresponding to the provisionally chosen first software keys, and perform an output process to output a reading voice corresponding to the allocated characters by the provisionally choosing operation.

* * * * *